US012639670B2

(12) United States Patent
Kakde et al.

(10) Patent No.: US 12,639,670 B2
(45) Date of Patent: May 26, 2026

(54) REAL-TIME PROXIMITY-BASED CONTEXTUAL INFORMATION FOR AN INDUSTRIAL ASSET

(71) Applicant: Honeywell International Inc., Morris Plains, NJ (US)

(72) Inventors: Sunderkumar Ashwath Kakde, Charlotte, NC (US); Unnikrishnan Poduval, Charlotte, NC (US); Venkata Srinivasulu Reddy Talamanchi, Charlotte, NC (US); Ramesh Gadamsetty Venkata Naga, Charlotte, NC (US); Prasad Panambur Kamath, Charlotte, NC (US); Ramesh Babu Koniki, Charlotte, NC (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 56 days.

(21) Appl. No.: 18/005,527

(22) PCT Filed: Jul. 8, 2021

(86) PCT No.: PCT/US2021/040905
§ 371 (c)(1),
(2) Date: Jan. 13, 2023

(87) PCT Pub. No.: WO2022/015574
PCT Pub. Date: Jan. 20, 2022

(65) Prior Publication Data
US 2023/0267417 A1     Aug. 24, 2023

Related U.S. Application Data

(60) Provisional application No. 63/052,236, filed on Jul. 15, 2020.

(51) Int. Cl.
*G06Q 10/10*          (2023.01)
*G06F 3/0481*         (2022.01)
(Continued)

(52) U.S. Cl.
CPC ......... *G06Q 10/103* (2013.01); *G06F 3/0481* (2013.01); *G06Q 10/06316* (2013.01);
(Continued)

(58) Field of Classification Search
CPC .................................................. G06Q 10/103
See application file for complete search history.

(56) References Cited

U.S. PATENT DOCUMENTS 10,671,028 B2 * 6/2020 Nixon et al. ........... G05B 11/01
2015/0153906 A1 * 6/2015 Liao et al. ............. G06F 3/0481
(Continued)

FOREIGN PATENT DOCUMENTS

EP          3318944 A2      5/2018
WO     2022/015574 A1      1/2022

OTHER PUBLICATIONS

JP Office Action Mailed on Mar. 13, 2024 for JP Application No. 2023502891, 9 page(s).
(Continued)

*Primary Examiner* — James J Debrow
(74) *Attorney, Agent, or Firm* — ALSTON & BIRD LLP

(57) ABSTRACT

Various embodiments described herein relate to real-time proximity-based contextual information for an industrial asset. In this regard, a request to establish a remote collaboration environment associated with an industrial asset in an industrial environment is received. The request includes an asset identifier provided by a mobile computing device proximate to the industrial asset. The request also includes location data associated with the industrial asset. In response to the request, contextual data for an industrial task associ-
(Continued)

100 ated with the industrial asset is determined based on the asset identifier and the location data. Furthermore, one or more interactive media elements associated with the industrial task is generated based on the contextual data. The one or more interactive media elements are communicated via the remote collaboration environment.

19 Claims, 14 Drawing Sheets

(51) Int. Cl.

| | | |
|---|---|---|
| *G06Q 10/0631* | (2023.01) | |
| *G11B 27/036* | (2006.01) | |
| *H04N 23/66* | (2023.01) | |
| *H04L 67/141* | (2022.01) | |

(52) U.S. Cl.
CPC ........... *G11B 27/036* (2013.01); *H04N 23/66* (2023.01); *H04L 67/141* (2013.01)

(56) References Cited

U.S. PATENT DOCUMENTS

| 2016/0088322 | A1 | 3/2016 | Horev et al. |
|---|---|---|---|
| 2016/0269631 | A1 | 9/2016 | Jiang et al. |

| 2016/0284128 | A1 | 9/2016 | Michalscheck et al. | |
|---|---|---|---|---|
| 2016/0314623 | A1 | 10/2016 | Coleman et al. | |
| 2016/0350595 | A1 | 12/2016 | Solomin et al. | |
| 2019/0033833 | A1* | 1/2019 | Acharya et al. ... | G05B 19/4183 |
| 2019/0325660 | A1* | 10/2019 | Schmirier et al. ...... | G06T 19/00 |
| 2021/0133607 | A1* | 5/2021 | Stubbs et al. ............ | G06N 5/04 |
| 2021/0312950 | A1* | 10/2021 | Kakde et al. .......... | G11B 27/34 |
| 2022/0171891 | A1* | 6/2022 | Sinha et al. ............ | G06F 30/12 |

OTHER PUBLICATIONS

English Translation of JP Office Action dated Jun. 24, 2024 for JP Application No. 2023502891, 4 page(s).

JP Office Action Mailed on Jun. 24, 2024 for JP Application No. 2023502891, 4 page(s).

SA Office Action Mailed on Sep. 1, 2024 for SA Application No. 523442185, 13 page(s).

SA Office Action Mailed on Feb. 4, 2025 for SA Application No. 523442185, 18 page(s).

AE Office Action, including Search Report Mailed on Apr. 30, 2025 for AE Application No. P6000120/2023, 8 page(s).

KW Office Action Mailed on Sep. 24, 2025 for KW Application No. KW/P/2023/0025, 7 page(s).

EP Office Action Mailed on Jun. 10, 2025 for EP Application No. 21748767, 6 page(s).

* cited by examiner

700

700

900

1000

1002

1100

1102

ONGOING CALL

00:18

PAUL MOLIVE
SHIFT SUPERVISOR

SPEAKER     CHAT     VIDEO

1200

1202

PAUL MOLIVE
SHIFT SUPERVISOR

CAN YOU SHARE AN IMAGE OF THE VALVE?
10:30 AM

SURE, HERE IT IS... 10:30 AM

THE DAMAGED VALVE     10:30 AM

HMM. LET ME CALL YOU...
10:30 AM

TYPE HERE

O ASSIST    REMOTE ASSIST    PROCESS ASSIST    ASSET ASSIST    SETTINGS

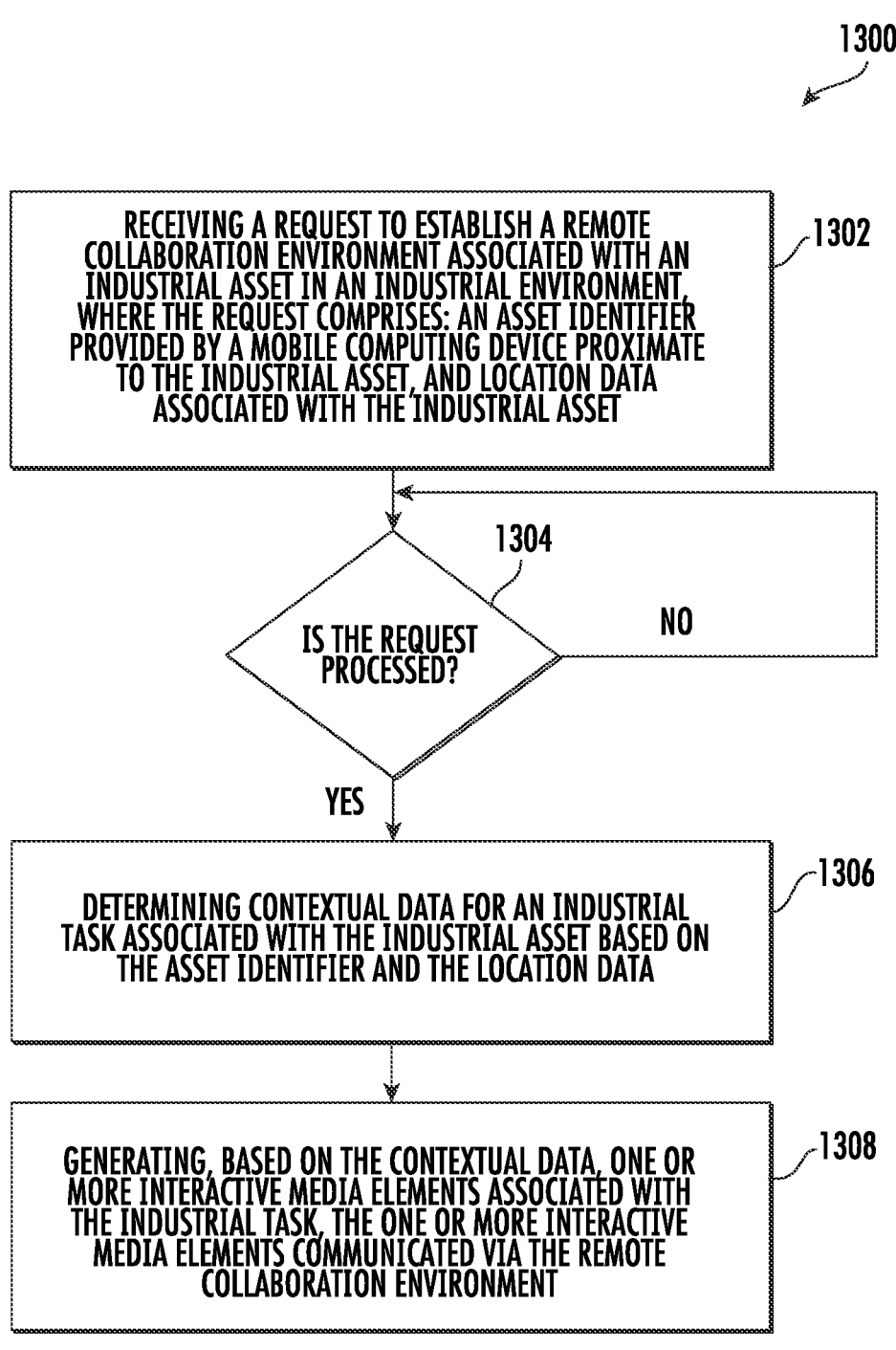

1300

RECEIVING A REQUEST TO ESTABLISH A REMOTE COLLABORATION ENVIRONMENT ASSOCIATED WITH AN INDUSTRIAL ASSET IN AN INDUSTRIAL ENVIRONMENT, WHERE THE REQUEST COMPRISES: AN ASSET IDENTIFIER PROVIDED BY A MOBILE COMPUTING DEVICE PROXIMATE TO THE INDUSTRIAL ASSET, AND LOCATION DATA ASSOCIATED WITH THE INDUSTRIAL ASSET
— 1302

IS THE REQUEST PROCESSED?    1304

NO

YES

DETERMINING CONTEXTUAL DATA FOR AN INDUSTRIAL TASK ASSOCIATED WITH THE INDUSTRIAL ASSET BASED ON THE ASSET IDENTIFIER AND THE LOCATION DATA
— 1306

GENERATING, BASED ON THE CONTEXTUAL DATA, ONE OR MORE INTERACTIVE MEDIA ELEMENTS ASSOCIATED WITH THE INDUSTRIAL TASK, THE ONE OR MORE INTERACTIVE MEDIA ELEMENTS COMMUNICATED VIA THE REMOTE COLLABORATION ENVIRONMENT
— 1308

FIG. 13

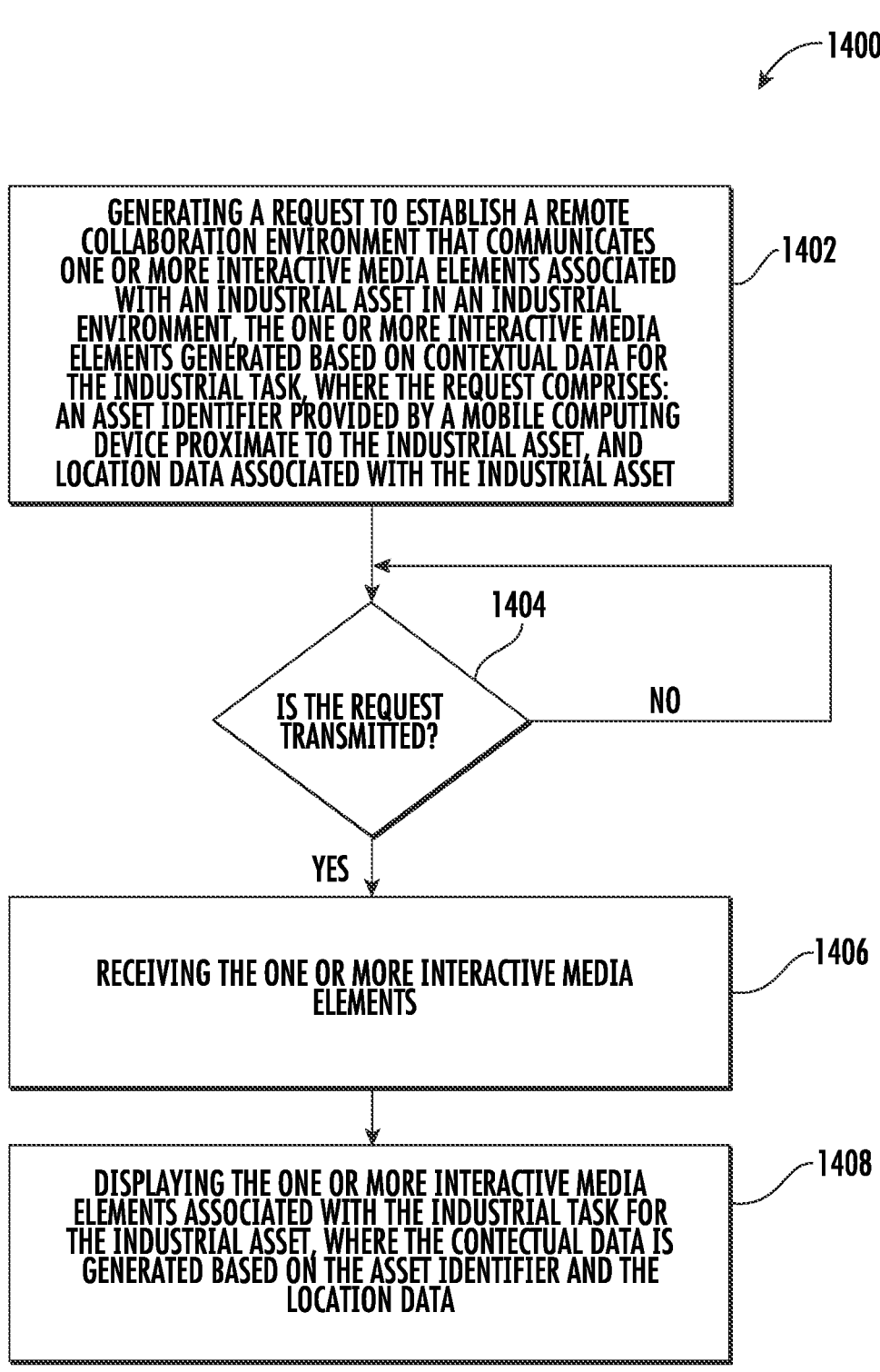

1400

GENERATING A REQUEST TO ESTABLISH A REMOTE COLLABORATION ENVIRONMENT THAT COMMUNICATES ONE OR MORE INTERACTIVE MEDIA ELEMENTS ASSOCIATED WITH AN INDUSTRIAL ASSET IN AN INDUSTRIAL ENVIRONMENT, THE ONE OR MORE INTERACTIVE MEDIA ELEMENTS GENERATED BASED ON CONTEXTUAL DATA FOR THE INDUSTRIAL TASK, WHERE THE REQUEST COMPRISES: AN ASSET IDENTIFIER PROVIDED BY A MOBILE COMPUTING DEVICE PROXIMATE TO THE INDUSTRIAL ASSET, AND LOCATION DATA ASSOCIATED WITH THE INDUSTRIAL ASSET

1402

1404

IS THE REQUEST TRANSMITTED?

NO

YES

RECEIVING THE ONE OR MORE INTERACTIVE MEDIA ELEMENTS

1406

DISPLAYING THE ONE OR MORE INTERACTIVE MEDIA ELEMENTS ASSOCIATED WITH THE INDUSTRIAL TASK FOR THE INDUSTRIAL ASSET, WHERE THE CONTEXTUAL DATA IS GENERATED BASED ON THE ASSET IDENTIFIER AND THE LOCATION DATA

REAL-TIME PROXIMITY-BASED CONTEXTUAL INFORMATION FOR AN INDUSTRIAL ASSET

CROSS-REFERENCE TO RELATED APPLICATIONS

This application claims the benefit of U.S. Provisional Patent Application No. 63/052,236, titled "REAL-TIME PROXIMITY-BASED CONTEXTUAL INFORMATION FOR AN INDUSTRIAL ASSET," and filed on Jul. 15, 2020, which is incorporated herein by reference in its entirety

TECHNICAL FIELD

The present disclosure relates generally to wearable devices, and more particularly to wearable device technologies for industrial environments.

BACKGROUND

Industrial field workers often rely on paper-based operating procedure documentation to perform tasks in an industrial environment. Certain tasks in an industrial environment generally involve visualization of industrial equipment and/or interaction with industrial equipment. However, it is often difficult for an industrial field worker to memorize each and every procedure for a given task in an industrial environment. Furthermore, it is often difficult for an industrial worker to carry paper-based operating procedure documentation along with other tools and/or safety equipment.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which:

FIG. 13 illustrates a flow diagram for facilitating establishing a remote collaboration environment, in accordance with one or more embodiments described herein; and FIG. 14 illustrates another flow diagram for facilitating establishing a remote collaboration environment, in accordance with one or more embodiments described herein.

DETAILED DESCRIPTION

Figure 1:
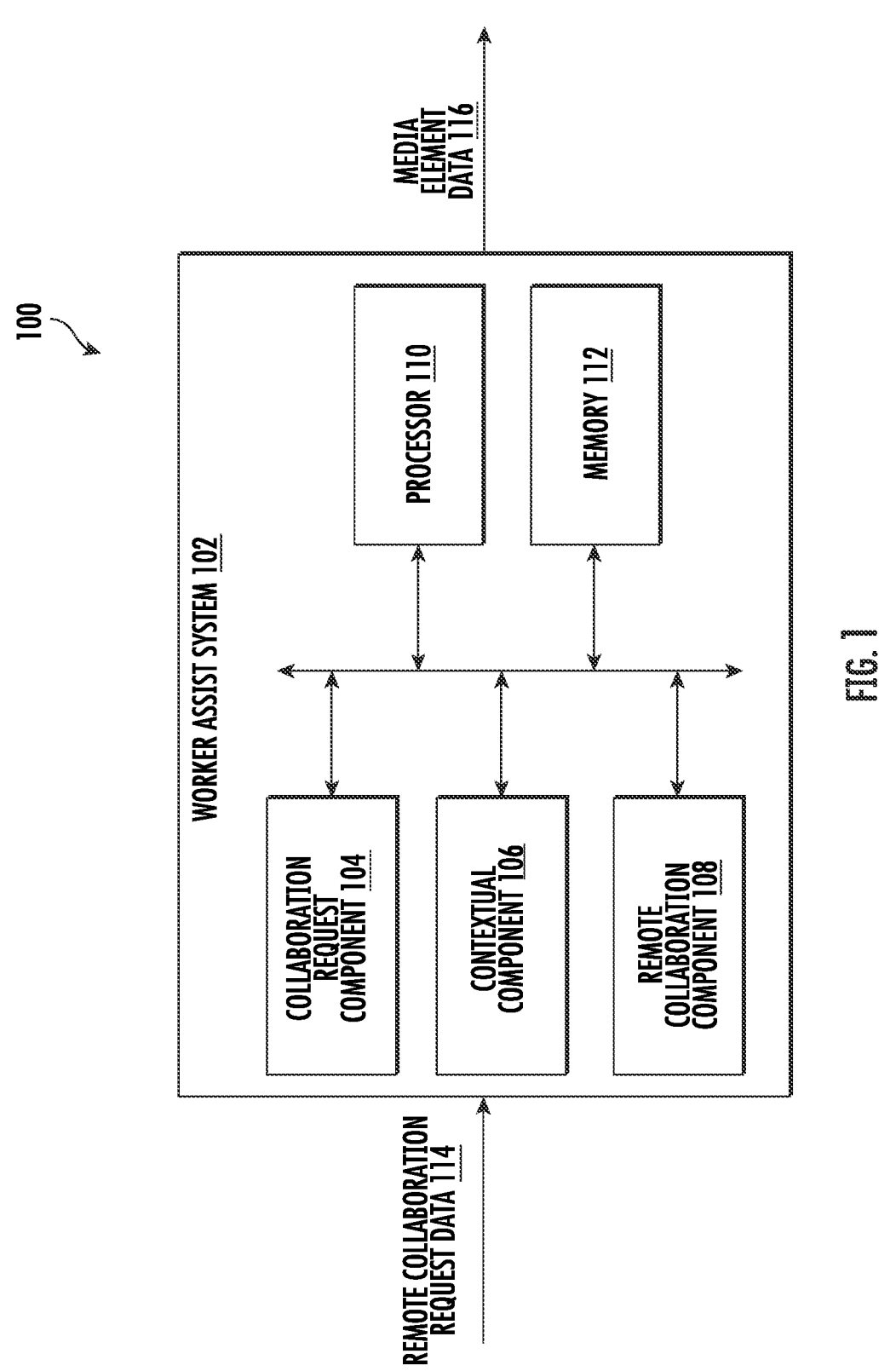
FIG. 1 illustrates a worker assist system, in accordance with one or more embodiments described herein.

Various embodiments of the present invention now will be described more fully hereinafter with reference to the accompanying drawings, in which some, but not all embodiments of the invention are shown. Indeed, the invention can be embodied in many different forms and should not be construed as limited to the embodiments set forth herein. Rather, these embodiments are provided so that this disclosure will satisfy applicable legal requirements. The term "or" is used herein in both the alternative and conjunctive sense, unless otherwise indicated. The terms "illustrative," "example," and "exemplary" are used to be examples with no indication of quality level. Like numbers refer to like elements throughout.

The phrases "in an embodiment," "in one embodiment," "according to one embodiment," and the like generally mean that the particular feature, structure, or characteristic following the phrase can be included in at least one embodiment of the present disclosure, and can be included in more than one embodiment of the present disclosure (importantly, such phrases do not necessarily refer to the same embodiment).

The word "exemplary" is used herein to mean "serving as an example, instance, or illustration." Any implementation described herein as "exemplary" is not necessarily to be construed as preferred or advantageous over other implementations.

If the specification states a component or feature "can," "may," "could," "should," "would," "preferably," "possibly," "typically," "optionally," "for example," "often," or "might" (or other such language) be included or have a characteristic, that particular component or feature is not required to be included or to have the characteristic. Such component or feature can be optionally included in some embodiments, or it can be excluded.

Industrial field workers often rely on paper-based operating procedure documentation to perform tasks in an industrial environment. Certain tasks in an industrial environment generally involve visualization of industrial equipment and/or interaction with industrial equipment. However, it is often difficult for an industrial field worker to memorize each and every procedure for a given task in an industrial environment. For instance, a task in an industrial environment is often performed in dynamic field conditions and can be associated with work flow procedures, task failure work flow procedures, emergency situation procedures and/or one or more other procedures. Furthermore, it is often difficult for an industrial worker to carry paper-based operating procedure documentation along with other tools and/or safety equipment.

Thus, to address these and/or other issues, real-time proximity-based contextual information for an industrial asset is disclosed herein. In this regard, various embodiments described herein relate to assisting an industrial worker with real-time proximity-based contextual information. Various embodiments described herein additionally or alternatively relate to identifying procedure step categories and creating a procedure tree for industrial video procedures to provide industrial workflows on a voice driven platform. In various embodiments, real-time collaboration between industrial workers is provided based on contextual information associated with industrial equipment. For example, in certain embodiments, one or more videos, one or more documents, asset tag details, real-time process data, real-time event data, asset work history information, one or more communication channels, and/or one or more media elements associated with industrial equipment are provided based on asset identifiers, asset information, asset manufacturer information, asset descriptions, asset location, work order details, event descriptions, and/or other contextual information related to the industrial equipment. In an embodiment, the real-time collaboration provides collaboration to facilitate completion of one or more industrial tasks related to the industrial equipment. In various embodiments, one or more interactive media elements associated with the real-time collaboration are provided for display via a visual display of a mobile computing device. Additionally or alternatively, in various embodiments, one or more interactive media elements associated with the real-time collaboration are provided for display via a head-mounted visual display of a wearable device.

In one or more embodiments, context-based information is employed to determine content for the one or more interactive media elements. In one example, the context-based information includes one or more documents (e.g., a document describing how to repair an industrial asset), one or more pre-recorded videos related to the industrial asset, and/or information regarding a remote expert to participate in the real-time collaboration. Additionally or alternatively, in one or more embodiments, the context-based information is based on location, information associated with an industrial asset, a state of an industrial asset, a maintenance history associated with an industrial asset, and/or other information associated with in industrial asset.

In one or more embodiments, the one or more interactive media elements are associated with a voice activated call. For example, in one or more embodiments, a call to a remote expert is initiated by a voice of a worker that employs a mobile computing device. In one or more embodiments, a video stream associated with a remote expert is initiated by a voice of a worker that employs a mobile computing device. In one or more embodiments, the remote expert is a remote expert associated with a previous remote collaboration session for the mobile computing device. Additionally or alternatively, in one or more embodiments, the remote expert is another worker for an industrial asset condition determined to be similar to a condition with the industrial asset. Additionally or alternatively, in one or more embodiments, the remote expert is determined based on a state of the industrial asset.

In one or more embodiments, a document related to the one or more interactive media elements is determined based on an ontological model. The ontological model is employed, in one or more embodiments, to determine a relationship between the industrial asset and one or more properties and/or one or more dependencies to another system. For instance, in an embodiment, the ontological model is employed to determine that a first industrial asset is a pump, that the first industrial asset has one or more particular properties (e.g., properties of flow rate, pressure, energy consumption, etc.), that a second industrial asset is a filter and has one or more properties (e.g., one or more properties of flow rate, valve state, etc.), and that output of the first industrial asset (e.g., the pump) is connected to the second industrial asset (e.g., the filter). As such, the ontological model is employed, in one or more embodiments, to determine that anything affecting the first industrial asset (e.g., the pump) may also affect the second industrial asset (e.g., the filter). Furthermore, in one or more embodiments, documents are stored at respective node of the ontology model such that if the worker is servicing a pump, for example, one or more pump documents for the pump type is easily determined.

Various embodiments disclosed herein additionally or alternatively create hypermedia for the industrial task. For instance, in an embodiment, two or more video procedures in a step description are hyperlinked to create a hypervideo. The hypervideo is a video stream that comprises one or more interactive hypermedia elements associated with the industrial task. The hypervideo also allows the video procedure to follow a non-linear information structure to, for example, allow an industrial field worker or an industrial field operator to make decisions based on content of the video procedure and dynamic field needs in an industrial environment. In certain embodiments, different hypervideos are linked to create a main procedure with different branches and/or different levels associated with sub-procedures for the industrial task. The different hypervideos are linked together, in certain embodiments, based on metadata and/or other contextual information. For example, in certain embodiments, two or more video procedures are hyperlinked based on metadata associated with the video procedures in response to categorization of steps for the video procedure.

In certain embodiments, two or more video procedures are linked to create a procedure tree based on the metadata and/or the other contextual information. In certain embodiments, two or more video procedures are hyperlinked to create a video procedure that follows a non-linear information structure. As such, in various embodiments, an industrial worker navigates the procedure tree based on content of the video and/or time-based context related to dynamic field changes. In various embodiments, one or more context recognition techniques, one or more object identification techniques, and/or one or more object tagging techniques are employed to generate the procedure tree associated with the non-linear information structure.

As such, increased productivity and/or reliability of industrial equipment is provided. An amount of time and/or an amount of rework to fix and/or service one or more portions of industrial equipment is also reduced. Performance of industrial equipment is therefore also improved. Moreover, a mobile computing device and/or a server system is improved by reducing processing requirements for the mobile computing device and/or the server system, reducing power consumption of the mobile computing device and/or the server system, and/or optimizing rendering of data via the a display of the mobile computing device and/or a wearable device in communication with the mobile computing device.

FIG. 1 illustrates a system 100 that provides an exemplary environment according to one or more described features of one or more embodiments of the disclosure. According to an embodiment, the system 100 includes a worker assist system 102 to facilitate a practical application of remote collaboration technology to provide a remote collaboration environment for industrial field workers. For instance, in one or more embodiments, the worker assist system 102 establishes a worker assist collaboration environment between a field worker in an industrial environment and a remote expert located remotely from the industrial environment.

In an embodiment, the worker assist system 102 is a server system (e.g., a server device) that facilitates a remote collaboration environment between two or more computing devices. The worker assist system 102 is also related to one or more technologies for mobile devices, such as, for example, mobile device technologies, wearable device technologies, wearable computer technologies, remote collaboration technologies, server technologies, industrial technologies, connected industrial plant technologies, industrial Internet of Things (IoT) technologies, navigation and asset visualization technologies, oil and gas technologies, petrochemical technologies, refinery technologies, process plant technologies, cloud technologies, cloud database technologies, network technologies, wireless communication technologies, video technologies, geolocation technologies, sensor technologies, image recognition technologies, machine learning technologies, artificial intelligence technologies, digital signal processing technologies, electronic device technologies, computer technologies, and/or one or more other technologies.

Moreover, the worker assist system 102 provides an improvement to one or more technologies such as mobile device technologies, wearable device technologies, wearable computer technologies, server technologies, industrial technologies, connected industrial plant technologies, industrial IoT technologies, navigation and asset visualization technologies, oil and gas technologies, petrochemical technologies, refinery technologies, process plant technologies, cloud technologies, cloud database technologies, network technologies, wireless communication technologies, video technologies, geolocation technologies, sensor technologies, image recognition technologies, machine learning technologies, artificial intelligence technologies, digital signal processing technologies, electronic device technologies, computer technologies, and/or one or more other technologies. In an implementation, the worker assist system 102 improves performance of a mobile device and/or a wearable device. For example, in one or more embodiments, the worker assist system 102 improves processing efficiency of a mobile device and/or a wearable device, reduces power consumption of a mobile device and/or a wearable device, improves quality of data provided by a mobile device and/or a wearable device, etc.

The worker assist system 102 includes a collaboration request component 104, a contextual component 106 and/or a remote collaboration component 108. Additionally, in certain embodiments, the worker assist system 102 includes a processor 110 and/or a memory 112. In certain embodiments, one or more aspects of the worker assist system 102 (and/or other systems, apparatuses and/or processes disclosed herein) constitute executable instructions embodied within a computer-readable storage medium (e.g., the memory 112). For instance, in an embodiment, the memory 112 stores computer executable component and/or executable instructions (e.g., program instructions). Furthermore, the processor 110 facilitates execution of the computer executable components and/or the executable instructions (e.g., the program instructions). In an example embodiment, the processor 110 is configured to execute instructions stored in the memory 112 or otherwise accessible to the processor 110.

The processor 110 is a hardware entity (e.g., physically embodied in circuitry) capable of performing operations according to one or more embodiments of the disclosure. Alternatively, in an embodiment where the processor 110 is embodied as an executor of software instructions, the software instructions configure the processor 110 to perform one or more algorithms and/or operations described herein in response to the software instructions being executed. In an embodiment, the processor 110 is a single core processor, a multi-core processor, multiple processors internal to the worker assist system 102, a remote processor (e.g., a processor implemented on a server), and/or a virtual machine. In certain embodiments, the processor 110 is in communication with the memory 112, the collaboration request component 104, the contextual component 106 and/or the remote collaboration component 108 via a bus to, for example, facilitate transmission of data among the processor 110, the memory 112, the collaboration request component 104, the contextual component 106 and/or the remote collaboration component 108. The processor 110 may embodied in a number of different ways and can, in certain embodiments, includes one or more processing devices configured to perform independently. Additionally or alternatively, in one or more embodiments, the processor 110 includes one or more processors configured in tandem via a bus to enable independent execution of instructions, pipelining of data, and/or multi-thread execution of instructions.

The memory 112 is non-transitory and includes, for example, one or more volatile memories and/or one or more non-volatile memories. In other words, in one or more embodiments, the memory 112 is an electronic storage device (e.g., a computer-readable storage medium). The memory 112 is configured to store information, data, content, one or more applications, one or more instructions, or the like, to enable the worker assist system 102 to carry out various functions in accordance with one or more embodiments disclosed herein. As used herein in this disclosure, the term "component," "system," and the like, is a computer-related entity. For instance, "a component," "a system," and the like disclosed herein is either hardware, software, or a combination of hardware and software. As an example, a component is, but is not limited to, a process executed on a processor, a processor, circuitry, an executable component, a thread of instructions, a program, and/or a computer entity.

In an embodiment, the worker assist system 102 (e.g., the collaboration request component 104 of the worker assist system 102) receives remote collaboration request data 114. The remote collaboration request data 114 includes a request to establish a remote collaboration environment with an industrial asset in an industrial environment. In an embodiment, the industrial asset is industrial equipment, one or more industrial tools, one or more industrial devices, one or more field devices, one or more industrial machines, and/or another type of industrial asset. In a non-limiting example, the industrial asset is a pump (e.g., a transfer pump, a centrifugal pump, etc.). In another non-limiting example, the industrial asset is a valve. In yet another non-limiting example, the industrial asset is a filter. However, it is to be appreciated that the industrial asset can be a different type of industrial asset in an industrial environment. The industrial environment is an area that includes one or more industrial assets accessible to and/or employed by industrial workers. In certain embodiments, industrial workers access the one or more industrial assets in the industrial environment to perform one or more industrial tasks related to the one or more industrial assets. In one or more embodiments, the industrial environment is an oil and gas industrial environment, a petrochemical industrial environment, a refinery industrial environment, a process plant industrial environment, a manufacturing industrial environment, an assembly industrial environment, or another type of industrial environment. The remote collaboration environment is a digital workspace that facilitates communication of visual data, textual data and/or audio data between computing devices.

In one or more embodiments, the remote collaboration request data 114 includes an asset identifier provided by a mobile computing device proximate to the industrial asset. The mobile computing device is, for example, a smartphone, a tablet computer, a mobile computer, a wearable device (e.g., an intelligent wearable device, a head-mounted wearable device, an eyewear device, etc.), a virtual reality device, an augmented reality device, or another type of mobile computing device. The asset identifier is a digital code such as, for example, a machine-readable code, a combination of numbers and/or letters, a string of bits, a barcode, a Quick Response (QR) code, an industrial asset tag number (e.g., an industrial equipment tag number), a digital label, a photo of the industrial asset, or another type of identifier. Furthermore, the asset identifier facilitates identification of the industrial asset. For instance, in an embodiment, the collaboration request component 104 employs the asset identifier to identify (e.g., uniquely identify) a type of industrial asset, a description of the industrial asset, a state of the industrial asset, configuration information for the industrial asset, maintenance history for the industrial asset, and/or one or more settings related to the industrial asset.

Additionally or alternatively, in one or more embodiments, the remote collaboration request data 114 includes location data associated with the industrial asset. The location data includes, in one or more embodiments, information regarding a location of the industrial asset. In an embodiment, the location data includes a location of the industrial asset. For instance, in an embodiment, the location data includes global positioning system (GPS) data (e.g., a latitude and/or a longitude) provided by a GPS device of the industrial asset. In another embodiment, the location data additionally or alternatively includes a location of a mobile computing device proximate to the industrial asset. For instance, in an embodiment, the location data includes GPS data (e.g., a latitude and/or a longitude) provided by a GPS device of a mobile computing device proximate to the industrial asset. In certain embodiments, the collaboration request component 104 or another component in communication with the collaboration request component 104 determines the location data based on the asset identifier. For instance, in certain embodiments, collaboration request component 104 or another component in communication with the collaboration request component 104 employs a mapping of asset identifiers to locations to determine the location data.

In certain embodiments, the collaboration request component 104 receives the remote collaboration request data 114 (e.g., the request to establish the remote collaboration environment) in response to a digital code being scanned by a mobile computing device proximate to the industrial asset. In certain embodiments, the collaboration request component 104 receives the remote collaboration request data 114 (e.g., the request to establish the remote collaboration environment) in response to establishment of a communication connection (e.g., a "short-link" radio connection) being established between the industrial asset and a mobile computing device proximate to the industrial asset. In certain embodiments, the collaboration request component 104 receives the remote collaboration request data 114 (e.g., the request to establish the remote collaboration environment) in response to a visual identification related to the industrial asset being identified via a camera of a mobile computing device proximate to the industrial asset. For instance, in certain embodiments, the asset identifier is determined based on one or more image recognition techniques associated with the industrial asset.

In response to the remote collaboration request data 114 being received by the worker assist system 102 (e.g., the remote collaboration request data 114 being received by the collaboration request component 104 of the worker assist system), the contextual component 106 determines contextual data for one or more industrial tasks associated with the industrial asset. For instance, in response to the request to establish the remote collaboration environment, the contextual component 106 determines contextual data for one or more industrial tasks associated with the industrial asset based on the remote collaboration request data 114. In one or more embodiments, in response to the request to establish the remote collaboration environment, the contextual component 106 determines contextual data for one or more industrial tasks associated with the industrial asset based on the asset identifier and/or the location data. The contextual data includes contextual details for the industrial asset and/or the one or more industrial tasks. In certain embodiments, the contextual data includes data stored by a server system. For instance, in certain embodiments, the contextual data is stored in the memory 112 and/or another datastore in communication with the worker assist system 102.

In an embodiment, the contextual data includes industrial task details for one or more industrial tasks to be performed with respect to the industrial asset. The industrial task details include, for example, work order details for the industrial asset, data logs associated with the industrial asset, historical data for previously performed industrial tasks associated with the industrial asset, and/or other industrial task information associated with the industrial asset. Additionally or alternatively, in an embodiment, the contextual data includes industrial asset tag details for the industrial asset. For example, in one or more embodiments, the contextual data includes an asset name for the industrial asset, an asset type for the industrial asset, a manufacturer for the industrial asset, and/or a description for the industrial asset. Additionally or alternatively, in an embodiment, the contextual data includes industrial event details associated with the industrial asset. The industrial event details include, for example, an event description for one or more events associated with the industrial asset, a timestamp for one or more events associated with the industrial asset, one or more industrial asset parameters associated with the one or more events associated with the industrial asset, and/or other industrial event information associated with the industrial asset.

In one or more embodiments, the contextual component 106 determines the contextual data for one or more industrial tasks associated with the industrial asset based on an ontological model. The ontological model is employed, in one or more embodiments, to determine a relationship between the industrial asset and another industrial asset. For instance, in an embodiment, the contextual component 106 employs the ontological model to compare one or more properties and/or one or more dependencies of the industrial asset to another industrial asset. For instance, in an embodiment, the contextual component 106 determines that the industrial asset is a pump. Furthermore, the contextual component 106 determines that the industrial asset is associated with one or more particular properties (e.g., properties of flow rate, pressure, energy consumption, etc.). The contextual component 106 also determines that another industrial asset is a filter and has one or more properties (e.g., one or more properties of flow rate, valve state, etc.). In one or more embodiments, the contextual component 106 employs the ontological model to compare the one or more particular properties of the industrial asset with the one or more properties of the other industrial asset. Furthermore, the ontological model can determine, in an example embodiment, that output of the industrial asset (e.g., the pump) is connected to the other industrial asset (e.g., the filter). As such, the contextual component 106 can determine, in an example embodiment, that anything affecting the first industrial asset (e.g., the pump) may also affect the second industrial asset (e.g., the filter).

The remote collaboration component 108 generates one or more interactive media elements based on the contextual data. For instance, the remote collaboration component 108 generates, based on the contextual data, media element data 116 that includes the one or more interactive media elements. In an aspect, the one or more interactive media elements are associated with the one or more industrial tasks for the industrial asset. Furthermore, the one or more industrial media elements includes visual data, textual data, documentation data, notification data, audio data, image data, video data, screensharing data and/or other media data. For instance, in one or more embodiments, the one or more industrial media elements include video, audio, one or more hypervideos, real-time data, one or more messages, one or more notifications, one or more documents, one or more work procedures, industrial asset tag details, desktop sharing data, file sharing data, whiteboard and annotation data, health and safety data, one or more communications with one or more remote computing devices, and/or other media data. In another aspect, the one or more interactive media elements provide a non-linear information structure and/or non-linear communications to, for example, allow an industrial field worker or an industrial field operator to make decisions with respect to the industrial asset based on content of the one or more industrial media elements. In certain embodiments, the remote collaboration component 108 generates the one or more interactive media elements based on the ontological model. For example, in one or more embodiments, respective industrial media elements are stored in respective nodes of the ontological model such that related industrial medial elements are efficiently identified and/or accessed via a node structure of the ontological model and a relationship between the nodes.

In one or more embodiments, the remote collaboration component 108 communicates the one or more industrial media elements via the remote collaboration environment. For instance, in one or more embodiments, the remote collaboration component 108 communicates the one or more industrial media elements to the mobile computing device and/or a remote computing device. In one example, the remote collaboration component 108 communicates the one or more industrial media elements to render the one or more interactive media elements via a visual display of the mobile computing device. Additionally or alternatively, the remote collaboration component 108 communicates the one or more industrial media elements to render the one or more interactive media elements via a wearable device in communication with the mobile computing device.

Additionally or alternatively, the remote collaboration component 108 communicates the one or more industrial media elements to render the one or more interactive media elements via a remote computing device in communication with the mobile computing device via the remote collaboration environment. The remote computing device is, for example, a smartphone, a tablet computer, a mobile computer, a desktop computer, a laptop computer, a workstation computer, a wearable device (e.g., an intelligent wearable device, a head-mounted wearable device, an eyewear device, etc.), a virtual reality device, an augmented reality device, or another type of computing device located remote from the mobile computing device. In certain embodiments, the remote collaboration component 108 selects the remote computing device for the remote collaboration environment based on the asset identifier and/or the location data. Additionally or alternatively, in certain embodiments, the remote collaboration component 108 selects the remote computing device for the remote collaboration environment based on historical data associated with one or more previous remote collaboration sessions associated with the mobile computing device.

In certain embodiments, the remote collaboration component 108 additionally or alternatively generates one or more interactive media elements based on data provided by the mobile computing device, a wearable device in communication with the mobile computing device, and/or a remote computing device in communication with the mobile computing device. For instance, in an embodiment, the remote collaboration component 108 additionally or alternatively generates the one or more interactive media elements based on camera data provided by the mobile computing device. In certain embodiments, the remote collaboration component 108 establishes remote control of a camera of the mobile computing device by the remote computing device during a remote collaboration session associated with the remote collaboration environment. In one or more embodiments, the remote control of the camera of the mobile computing device is employed to generate one or more interactive media elements.

In one or more embodiments, the remote control of the camera of the mobile computing device includes remote control of one or more camera functions of the camera. In an embodiment, the remote control of the camera of the mobile computing device includes control of a zoom level of the camera. For example, the remote control of the camera can optically zoom the camera view in or digitally zoom the camera view in by increasing a focal length of the camera. Alternatively, the remote control of the camera can optically zoom the camera view out or digitally zoom the camera view out by decreasing a focal length of the camera. In another embodiment, the remote control of the camera of the mobile computing device includes control of a flash function of the camera. For example, the remote control of the camera can set a flash state of the camera to an on mode or turn a flash state of the camera to an off mode. In another embodiment, the remote control of the camera of the mobile computing device includes initiating capture of one or more images and/or one or more videos via the camera. In another embodiment, the remote control of the camera of the mobile computing device includes initiating a real-time video stream (e.g., between the mobile computing device and the remote computing device) via the camera of the mobile computing device. However, it is to be appreciated that, in certain embodiments, the remote control of the camera of the mobile computing device includes control of one or more other camera functions of the camera.

In certain embodiments, an authorization process associated with the remote computing device is employed to establish the remote control of the camera of the mobile computing device. For example, in certain embodiments, the remote computing device sends a request to the mobile computing device to request control of the camera of the mobile computing device. In certain embodiments, the request is configured as a notification that is rendered via a visual display of the mobile computing device. Furthermore, in certain embodiments, the notification is configured to receive user input via the visual display to facilitate approval or denial of the remote control of the camera of the mobile computing device. In response to denial of the request by the mobile computing device, the remote computing device is not provided access to the camera of the mobile computing device. However, in response to approval of the request by the mobile computing device, the remote computing device is provided access to the camera of the mobile computing device.

In certain embodiments, in response to approval of the request by the mobile computing device, the remote computing device is granted remote control of the camera of the mobile computing device for a defined period of time. In certain embodiments, in response to approval of the request by the mobile computing device, the remote computing device is granted remote control of the camera of the mobile computing device until the mobile computing device revokes access to the remote computing device. In certain embodiments, the authorization process associated with the remote computing device is initiated during a communication session (e.g., a phone call or another type of communication session) between the mobile computing device and the remote computing device. In certain embodiments, the authorization process associated with the remote computing device includes exchange of one or more authorization tokens between the mobile computing device and the remote computing device. In certain embodiments, the mobile computing device is configured to override one or more actions initiated by the remote computing device for the remote control of the camera. For example, in certain embodiments, the mobile computing device alters a camera function (e.g., turn camera flash on) provided by the remote computing device to another camera function (e.g., turn camera flash off).

In certain embodiments, the remote collaboration component 108 records at least a portion of a remote collaboration session associated with the remote collaboration environment. Additionally, in certain embodiments, the remote collaboration component 108 adds the portion of the remote collaboration session as an interactive media element for storage in the memory 112 and/or another datastore in communication with the worker assist system 102. For instance, in certain embodiments, the remote collaboration component 108 adds the portion of the remote collaboration session to the contextual data stored in the memory 112 and/or another datastore in communication with the worker assist system 102. In one embodiment, the remote collaboration component 108 adds the portion of the remote collaboration session to a hypervideo. A hypervideo is, for example, a video stream related to one or more industrial tasks for the industrial task. In an embodiment, a hypervideo includes a set of videos associated with a logical grouping of one or more steps to guide a user towards completion of one or more industrial tasks. In one or more embodiments, a hypervideo includes one or more interactive hypermedia elements associated with the industrial task. For instance, in one or more embodiments, a hypervideo includes one or more interactive hypermedia elements associated with video, audio, real-time data, documents, work procedures, health and safety information, and/or other information.

In certain embodiments, the remote collaboration component 108 generates the one or more interactive media elements based on bandwidth data indicative of a bandwidth condition of the mobile computing device. For instance, in certain embodiments, the remote collaboration component 108 provides a modified version of the one or more interactive media elements to provide low bandwidth support for the mobile computing device. In one example, the remote collaboration component 108 receives the bandwidth data by the mobile computing device. In another example, the remote collaboration component 108 determines the bandwidth data based on monitoring of a communication channel associated with the mobile computing device.

Figure 2:
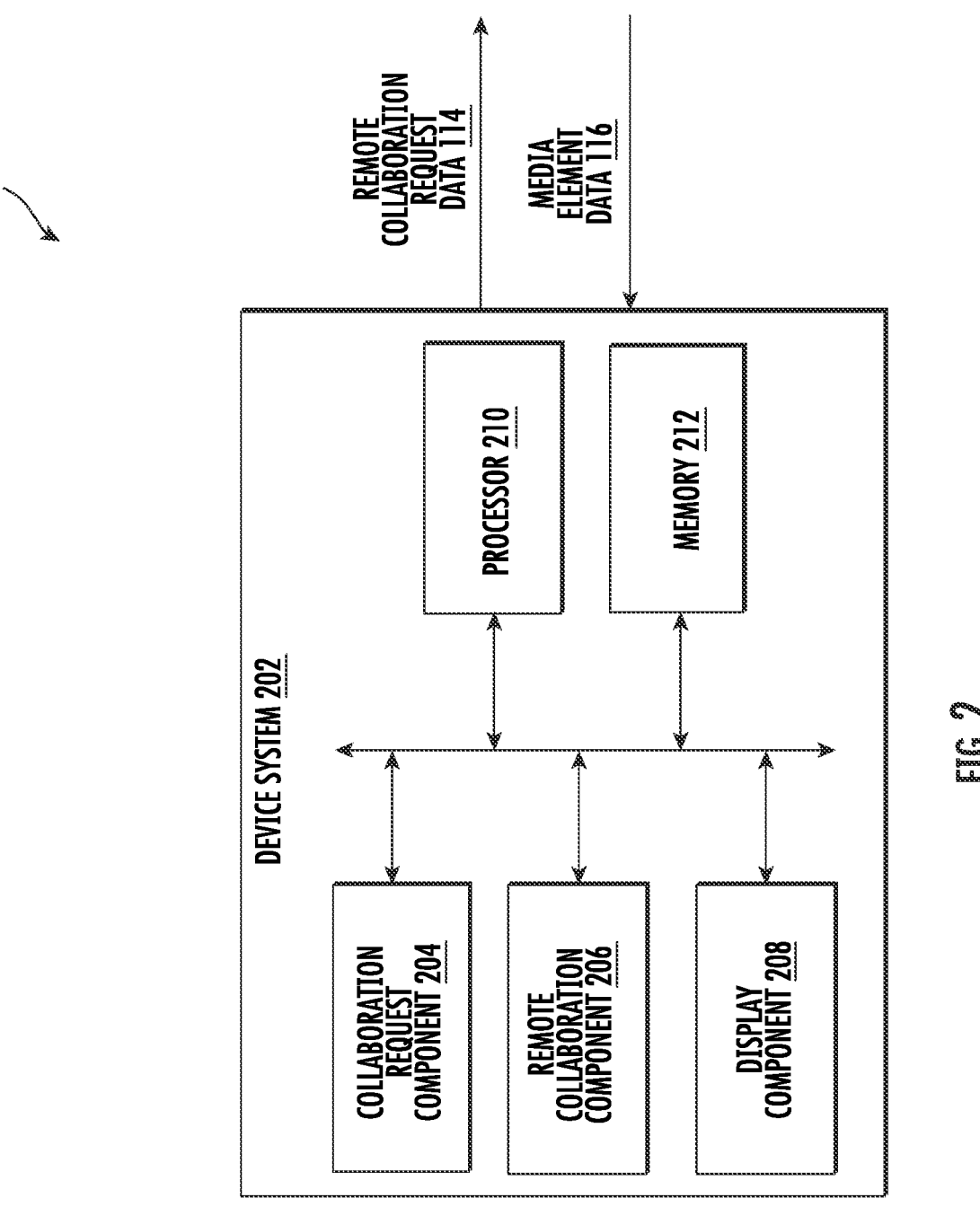
FIG. 2 illustrates a device system, in accordance with one or more embodiments described herein.

FIG. 2 illustrates a system 200 that provides an exemplary environment according to one or more described features of one or more embodiments of the disclosure. According to an embodiment, the system 200 includes a device system 202 to facilitate a practical application of remote collaboration technology to provide a remote collaboration environment for industrial field workers.

In an embodiment, the device system 202 is a device system (e.g., a component of a computing device) that participates in a remote collaboration environment between two or more computing devices. For instance, in an embodiment, the device system 202 is included in a mobile computing device and/or a wearable device proximate to the industrial asset. The device system 202 is also related to one or more technologies for mobile devices, such as, for example, mobile device technologies, wearable device technologies, wearable computer technologies, remote collaboration technologies, server technologies, industrial technologies, connected industrial plant technologies, industrial IoT technologies, navigation and asset visualization technologies, oil and gas technologies, petrochemical technologies, refinery technologies, process plant technologies, cloud technologies, cloud database technologies, network technologies, wireless communication technologies, video technologies, geolocation technologies, sensor technologies, image recognition technologies, machine learning technologies, artificial intelligence technologies, digital signal processing technologies, electronic device technologies, computer technologies, and/or one or more other technologies.

Moreover, the device system 202 provides an improvement to one or more technologies such as mobile device technologies, wearable device technologies, wearable computer technologies, server technologies, industrial technologies, connected industrial plant technologies, industrial IoT technologies, navigation and asset visualization technologies, oil and gas technologies, petrochemical technologies, refinery technologies, process plant technologies, cloud technologies, cloud database technologies, network technologies, wireless communication technologies, video technologies, geolocation technologies, sensor technologies, image recognition technologies, machine learning technologies, artificial intelligence technologies, digital signal processing technologies, electronic device technologies, computer technologies, and/or one or more other technologies. In an implementation, the device system 202 improves performance of a mobile device and/or a wearable device. For example, in one or more embodiments, the device system 202 improves processing efficiency of a mobile device and/or a wearable device, reduces power consumption of a mobile device and/or a wearable device, improves quality of data provided by a mobile device and/or a wearable device, etc.

The device system 202 includes a collaboration request component 204, a remote collaboration component 206 and/or a display component 208. Additionally, in certain embodiments, the device system 202 includes a processor 210 and/or a memory 212. In certain embodiments, one or more aspects of the device system 202 (and/or other systems, apparatuses and/or processes disclosed herein) constitute executable instructions embodied within a computer-readable storage medium (e.g., the memory 212). For instance, in an embodiment, the memory 212 stores computer executable component and/or executable instructions (e.g., program instructions). Furthermore, the processor 210 facilitates execution of the computer executable components and/or the executable instructions (e.g., the program instructions). In an example embodiment, the processor 210 is configured to execute instructions stored in the memory 212 or otherwise accessible to the processor 210.

The processor 210 is a hardware entity (e.g., physically embodied in circuitry) capable of performing operations according to one or more embodiments of the disclosure. Alternatively, in an embodiment where the processor 210 is embodied as an executor of software instructions, the software instructions configure the processor 210 to perform one or more algorithms and/or operations described herein in response to the software instructions being executed. In an embodiment, the processor 210 is a single core processor, a multi-core processor, multiple processors internal to the device system 202, a remote processor (e.g., a processor implemented on a server), and/or a virtual machine. In certain embodiments, the processor 210 is in communication with the memory 212, the collaboration request component 204, the remote collaboration component 206 and/or the display component 208 via a bus to, for example, facilitate transmission of data among the processor 210, the memory 212, the collaboration request component 204, the remote collaboration component 206 and/or the display component 208. The processor 210 may embodied in a number of different ways and can, in certain embodiments, includes one or more processing devices configured to perform independently. Additionally or alternatively, in one or more embodiments, the processor 210 includes one or more processors configured in tandem via a bus to enable independent execution of instructions, pipelining of data, and/or multi-thread execution of instructions.

The memory 212 is non-transitory and includes, for example, one or more volatile memories and/or one or more non-volatile memories. In other words, in one or more embodiments, the memory 212 is an electronic storage device (e.g., a computer-readable storage medium). The memory 212 is configured to store information, data, content, one or more applications, one or more instructions, or the like, to enable the device system 202 to carry out various functions in accordance with one or more embodiments disclosed herein. As used herein in this disclosure, the term "component," "system," and the like, is a computer-related entity. For instance, "a component," "a system," and the like disclosed herein is either hardware, software, or a combination of hardware and software. As an example, a component is, but is not limited to, a process executed on a processor, a processor, circuitry, an executable component, a thread of instructions, a program, and/or a computer entity.

In an embodiment, the device system 202 (e.g., the collaboration request component 204 of the worker assist system 202) generates the remote collaboration request data 114. For instance, in an embodiment, the collaboration request component 204 generates the request to establish the remote collaboration environment. In an embodiment, the request to establish the remote collaboration environment includes the asset identifier and/or the location data. In certain embodiments, the collaboration request component 204 generates the remote collaboration request data 114 (e.g., the request to establish the remote collaboration environment) in response to a digital code being scanned by the mobile computing device proximate to the industrial asset. In certain embodiments, the collaboration request component 204 generates the remote collaboration request data 114 (e.g., the request to establish the remote collaboration environment) in response to establishment of a communication connection (e.g., a "short-link" radio connection) being established between the industrial asset and the mobile computing device proximate to the industrial asset. In certain embodiments, the collaboration request component 204 generates the remote collaboration request data 114 (e.g., the request to establish the remote collaboration environment) in response to a visual identification related to the industrial asset being identified via a camera of the mobile computing device proximate to the industrial asset. For instance, in certain embodiments, the asset identifier is determined by the collaboration request component 204 based on one or more image recognition techniques associated with the industrial asset.

In another embodiment, in response to the request to establish the remote collaboration environment, the device system 202 (e.g., the remote collaboration component 206 of the worker assist system 202) receives the media element data 116. For instance, in response to the request that is generated by the device system 202 via the remote collaboration request data 114, the remote collaboration component 206 receives the one or more interactive media elements included in the media element data 116. In an embodiment, the display component 208 displays the media element data 116 (e.g., the one or more interactive media elements included in the media element data 116) via the remote collaboration environment. For instance, in response to the request that is generated by the device system 202 via the remote collaboration request data 114, the display component 208 displays the one or more interactive media elements associated with the one or more industrial tasks for the industrial asset.

In an embodiment, the display component 208 renders the one or more interactive media elements via a visual display of the mobile computing device. Additionally or alternatively, the display component 208 communicates with a wearable device (e.g., a wearable device in communication with the mobile computing device) to renders the one or more interactive media elements via the wearable device. The one or more interactive media elements displayed by the display component 208 includes video, audio, one or more hypervideos, real-time data, one or more messages, one or more notifications, one or more documents, one or more work procedures, industrial asset tag details, desktop sharing data, file sharing data, whiteboard and annotation data, health and safety data, one or more communications with one or more remote computing devices, and/or other media data. For instance, in an embodiment, the display component 208 displays video data, documentation data, and/or other media data provided by a server system (e.g., the worker assist system 102). Additionally or alternatively, in an embodiment, the display component 208 displays audio data, video data, screensharing data, notification data, and/or other media data provided by a remote computing device in communication with the mobile computing device via the remote collaboration environment.

In certain embodiments, the display component 208 generates camera data provided by a camera of the mobile computing device. The camera data is displayed, in one or more embodiments, via the remote collaboration environment. For instance, in one or more embodiments, the display component 208 overlays the camera data with one or more media elements included in the media element data 116. In certain embodiments, the display component 208 enables remote control of a camera of the mobile computing device by a remote computing device during the remote collaboration session. In certain embodiments, the display component 208 configures a notification for rendering via a visual display of the mobile computing device to facilitate the remote collaboration session. For example, in certain embodiments, the display component 208 configures the notification to receive user input via the visual display to facilitate approval or denial of the remote control of the camera via the remote computing device. In certain embodiments, the remote collaboration component 206 records at least a portion of a remote collaboration session associated with the remote collaboration environment.

In certain embodiments, the remote collaboration component 206 transmits the recording to a server system (e.g., the worker assist system 102) to facilitate storing the recording as an interactive media element. For instance, in certain embodiments, the remote collaboration component 206 transmits the recording to a server system (e.g., the worker assist system 102) to facilitate storing the recording as new contextual data. In one embodiment, the remote collaboration component 206 transmits the recording to a server system (e.g., the worker assist system 102) to facilitate storing the recording as a hypervideo. In certain embodiments, the recording is employed to create one or more training modules associated with the one or more industrial tasks for the industrial asset. In certain embodiments, the recording undergoes postprocessing to facilitate creation of the one or more training modules associated with the one or more industrial tasks for the industrial asset. In certain embodiments, the recording is configured as one or more workflows associated with the one or more industrial tasks for the industrial asset. For example, in certain embodiments, the recording is divided into one or more workflow videos associated with the one or more industrial tasks for the industrial asset. In certain embodiments, the recording is enhanced with additional text, additional graphics, or other additional media.

Figure 3:
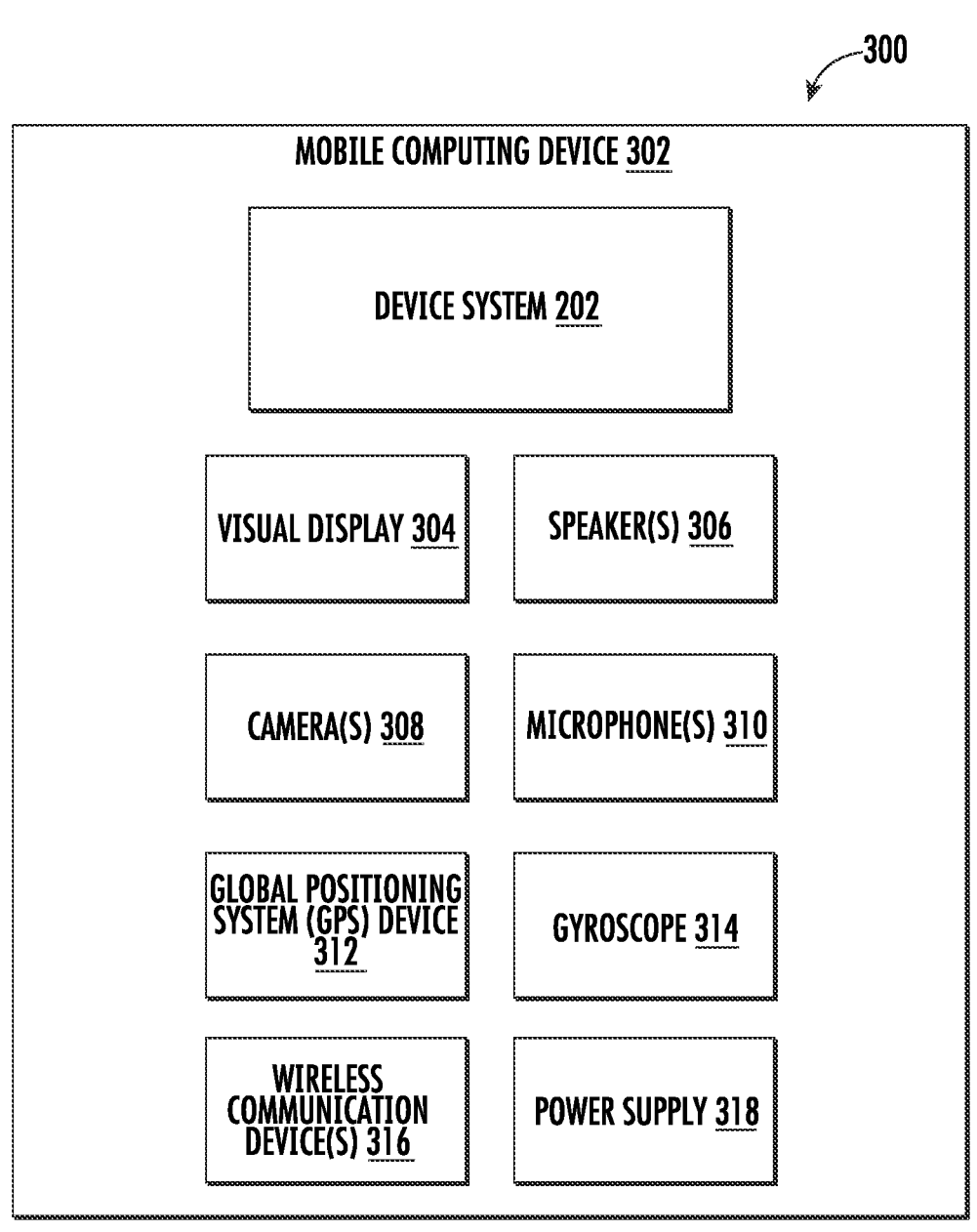
FIG. 3 illustrates a mobile computing device that includes the device system, in accordance with one or more embodiments described herein.

FIG. 3 illustrates a system 300 that provides an exemplary environment according to one or more embodiments of the disclosure. The system 300 includes a device 302. In an embodiment, the device 302 is a mobile computing device. In another embodiment, the device is a wearable device (e.g., a wearable computer) capable of being worn by a human. In an aspect, the device 202 employs handsfree mobile computing, augmented reality, cloud-based computing, IoT technology and/or one or more other technologies to provide video, audio, one or more hypervideos, real-time data, one or more messages, one or more notifications, one or more documents, one or more work procedures, industrial asset tag details, desktop sharing data, file sharing data, whiteboard and annotation data, health and safety data, one or more communications with one or more remote computing devices, and/or other media data in response to a request to establish a remote collaboration environment. In one more embodiments, one or more portions of the device 302 is controlled via voice commands associated with a voice-controlled user interface. The device 302 includes mechanical components, electrical components, hardware components and/or software components to facilitate intelligent mobile computing technology for industrial field workers. In the embodiment shown in FIG. 3, the device 302 includes the device system 202, a visual display 304, one or more speakers 306, one or more cameras 308, one or more microphones 310, a global positioning system (GPS) device 312, a gyroscope 314, one or more wireless communication devices 316, and/or a power supply 318.

In an embodiment, the visual display 304 is a display that facilitates presentation and/or interaction with a remote collaboration environment. In one or more embodiments, the visual display 304 displays an electronic interface associated with the remote collaboration environment. In one or more embodiments, the visual display 304 is a head-mounted visual display that renders media element data 116 (e.g., the one or more interactive media elements) via a set of pixels. In one or more embodiments, the visual display 304 is an eyewear display that renders media element data 116 (e.g., the one or more interactive media elements) via a set of pixels. The one or more speakers 306 include one or more integrated speakers that project audio. The one or more cameras 308 include one or more cameras that employ autofocus and/or image stabilization for hi-resolution photo capture and/or real-time video chat. The one or more microphones 310 include one or more digital microphones that employ active noise cancellation to capture audio data. The GPS device 312 provides a geographic location for the mobile computing device 302. The gyroscope 314 provides an orientation for the mobile computing device 302. The one or more wireless communication devices 316 includes one or more hardware components to provide wireless communication via one or more wireless networking technologies and/or one or more short-wavelength wireless technologies. The power supply 318 is, for example, a rechargeable battery that provides power to the device system 302, the visual display 304, the one or more speakers 306, the one or more cameras 308, the one or more microphones 310, the GPS device 312, the gyroscope 314, and/or the one or more wireless communication devices 316. In certain embodiments, the device system 302 employs data provided by the one or more cameras 308, the one or more microphones 310, the GPS device 312, the gyroscope 314, and/or the one or more wireless communication devices 316 to facilitate generation of the remote collaboration request data 114 and/or data presented via the remote collaboration environment. Furthermore, in one or more embodiments, at least a portion of the media element data 116 is presented via the visual display 304 and/or the one or more speakers 306.

Figure 4:
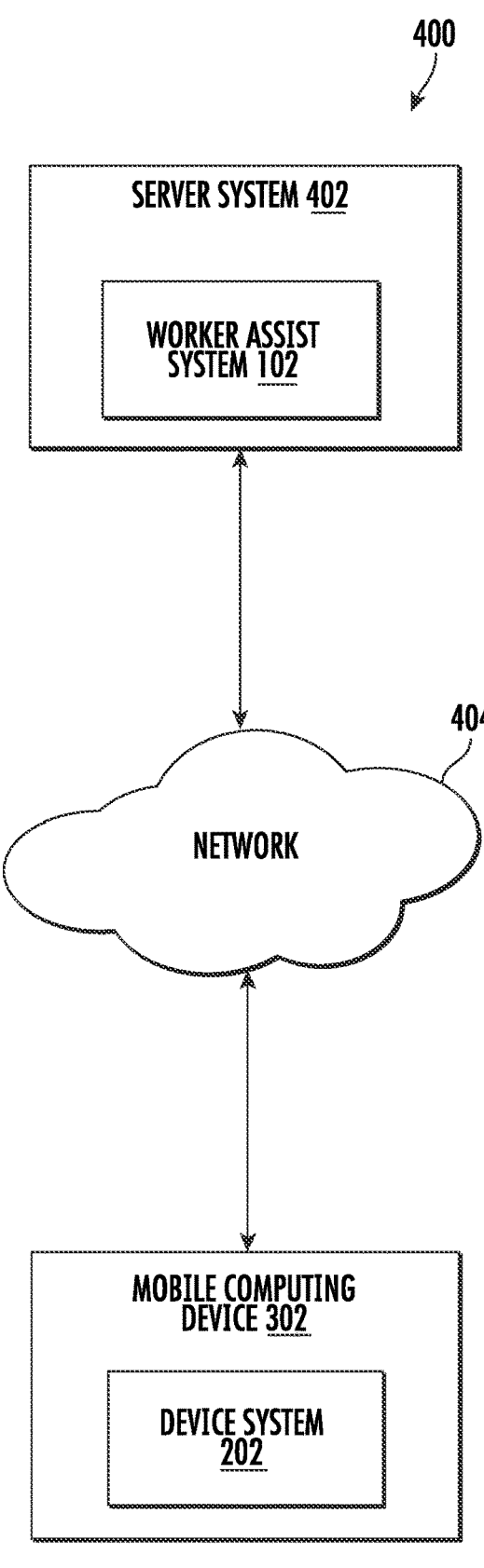
FIG. 4 illustrates a system for facilitating real-time proximity-based contextual information for an industrial asset, in accordance with one or more embodiments described herein.

FIG. 4 illustrates a system 400 that provides an exemplary environment according to one or more embodiments of the disclosure. The system 400 includes the mobile computing device 302 and a server system 402. According to one or more embodiments, the mobile computing device 302 includes the device system 202. Furthermore, according to one or more embodiments, the server system 402 includes the worker assist system 102. In one or more embodiments, the mobile computing device 302 is in communication with the server system 402 via a network 404. The network 404 is, for example, a communications network that employs wireless technologies and/or wired technologies to transmit data between the mobile computing device 302 and the server system 402. For instance, in one or more embodiments, the network 404 is a Wi-Fi network, a Near Field Communications (NFC) network, a Worldwide Interoperability for Microwave Access (WiMAX) network, a personal area network (PAN), a short-range wireless network (e.g., a Bluetooth® network), an infrared wireless (e.g., IrDA)

network, an ultra-wideband (UWB) network, an induction wireless transmission network, and/or another type of network.

Figure 5:
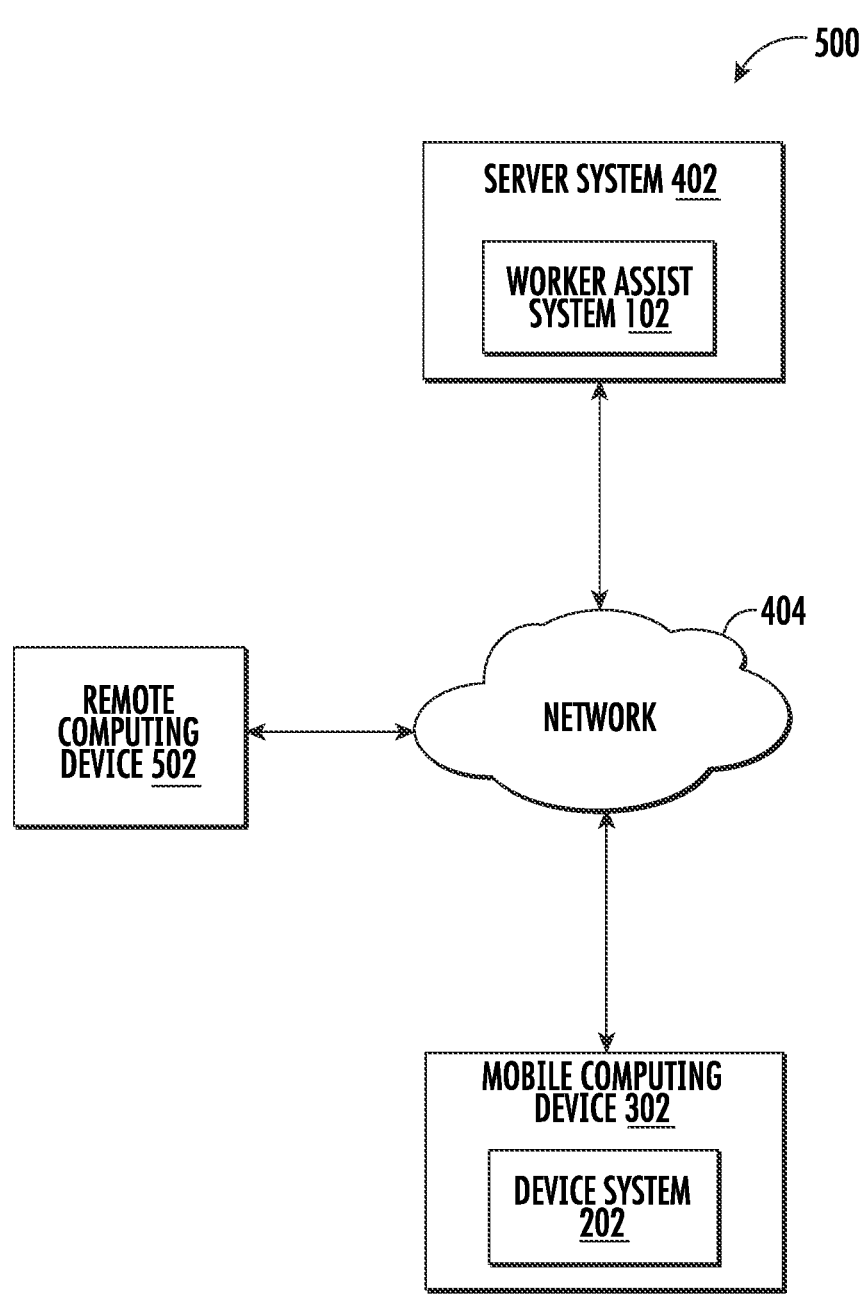
FIG. 5 illustrates another system for facilitating real-time proximity-based contextual information for an industrial asset, in accordance with one or more embodiments described herein.

FIG. 5 illustrates a system 500 that provides an exemplary environment according to one or more embodiments of the disclosure. The system 500 includes the mobile computing device 302, the server system 402, and/or a remote computing device 502. According to one or more embodiments, the mobile computing device 302 includes the device system 202. Furthermore, according to one or more embodiments, the server system 402 includes the worker assist system 102. In one or more embodiments, the mobile computing device 302 is in communication with the server system 402 and/or the remote computing device via the network 404. The remote computing device 502 is, for example, a smartphone, a tablet computer, a mobile computer, a desktop computer, a laptop computer, a workstation computer, a wearable device (e.g., an intelligent wearable device, a head-mounted wearable device, etc.), a virtual reality device, an augmented reality device, or another type of computing device located remote from the mobile computing device. In an aspect, the remote computing device 502 is associated with a remote expert participating in a remote collaboration environment for an industrial asset.

Figure 6:
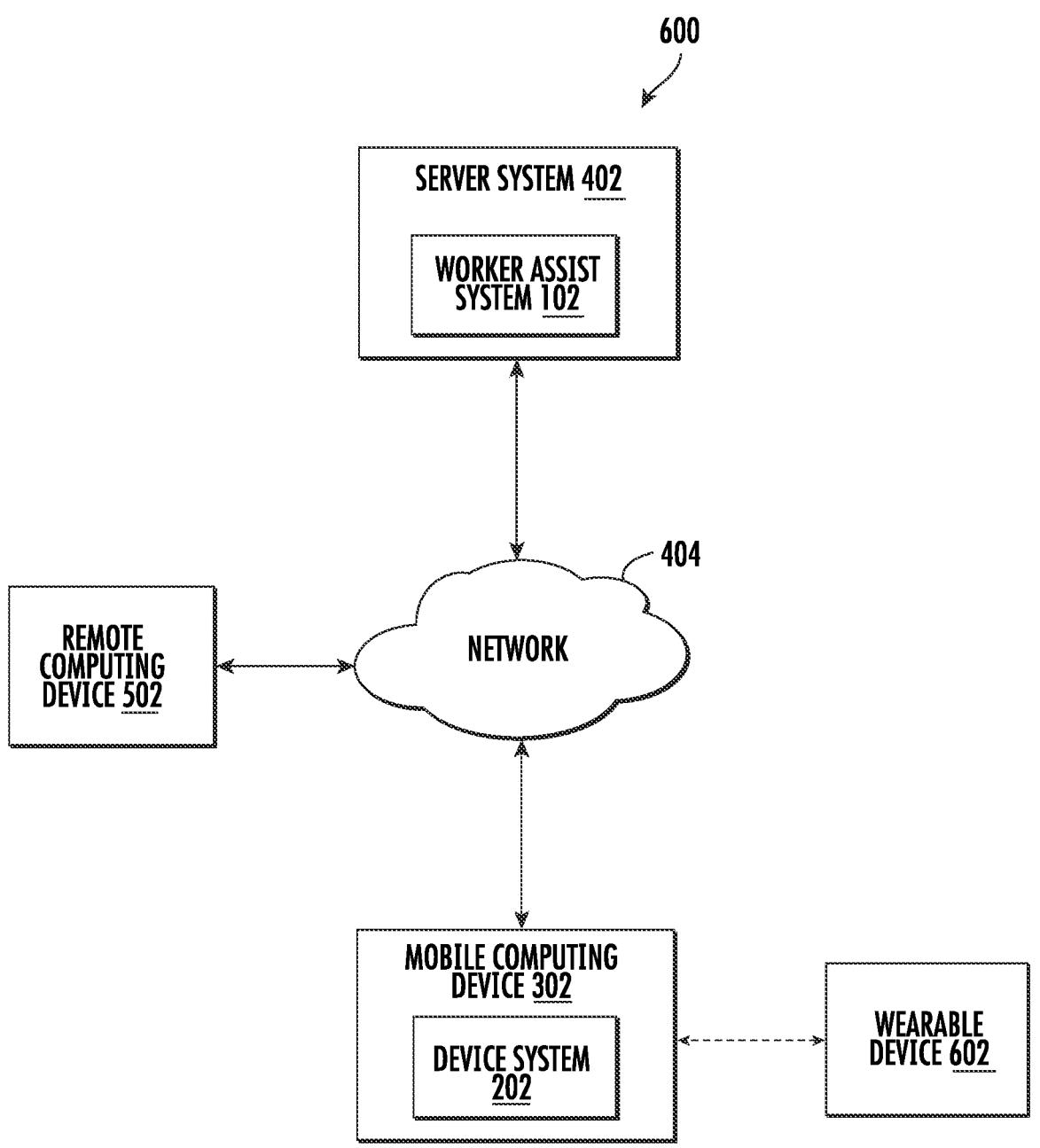
FIG. 6 illustrates yet another system for facilitating real-time proximity-based contextual information for an industrial asset, in accordance with one or more embodiments described herein.

FIG. 6 illustrates a system 600 that provides an exemplary environment according to one or more embodiments of the disclosure. The system 600 includes the mobile computing device 302, the server system 402, the remote computing device 502, and/or a wearable device 602. According to one or more embodiments, the mobile computing device 302 includes the device system 202. Furthermore, according to one or more embodiments, the server system 402 includes the worker assist system 102. In one or more embodiments, the mobile computing device 302 is in communication with the server system 402 and/or the remote computing device via the network 404. Additionally, in one or more embodiments, the mobile computing device 302 is in communication with the wearable device 602. In an embodiment, the mobile computing device 302 is in communication with the wearable device 602 via the network 404. In another embodiment, the mobile computing device 302 is additionally or alternatively in communication with the wearable device 602 via a short-range wireless network (e.g., a Bluetooth network) that is different than the network 404. According to one or more embodiments, the wearable device 602 is a wearable computer (e.g., an intelligent wearable device) that renders the one or more interactive media elements via a display of the wearable device. In one embodiment, the wearable device 602 is a wearable computer with a head-mounted visual display that renders the one or more interactive media elements. In another embodiment, the wearable device 602 is a eyewear device that renders the one or more interactive media elements.

Figure 7:
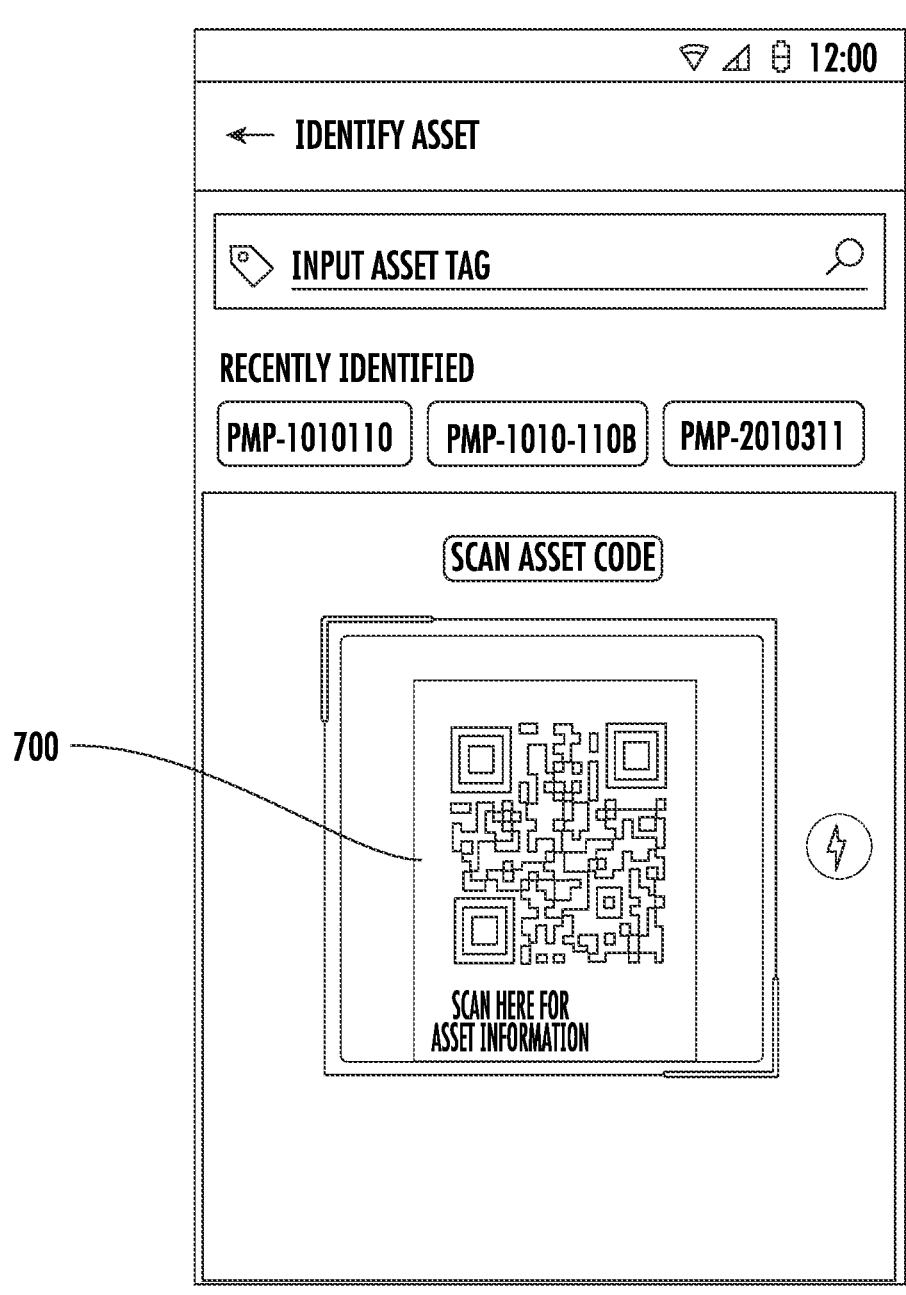
FIG. 7 illustrates an exemplary electronic interface, in accordance with one or more embodiments described herein.

FIG. 7 illustrates an exemplary electronic interface 700 according to one or more embodiments of the disclosure. In an embodiment, the electronic interface 700 is an electronic interface of the mobile computing device 302 that is presented via the visual display 304. In one or more embodiments, the collaboration request component 104 receives the remote collaboration request data 114 (e.g., the request to establish the remote collaboration environment) in response to a digital code 700 being scanned by a camera (e.g., the one or more cameras 308) of the mobile computing device 302. In an aspect, the digital code 700 provides an asset identifier for an industrial asset. In an embodiment, the digital code 700 is a QR code that provides an asset identifier for an industrial asset.

Figure 8:
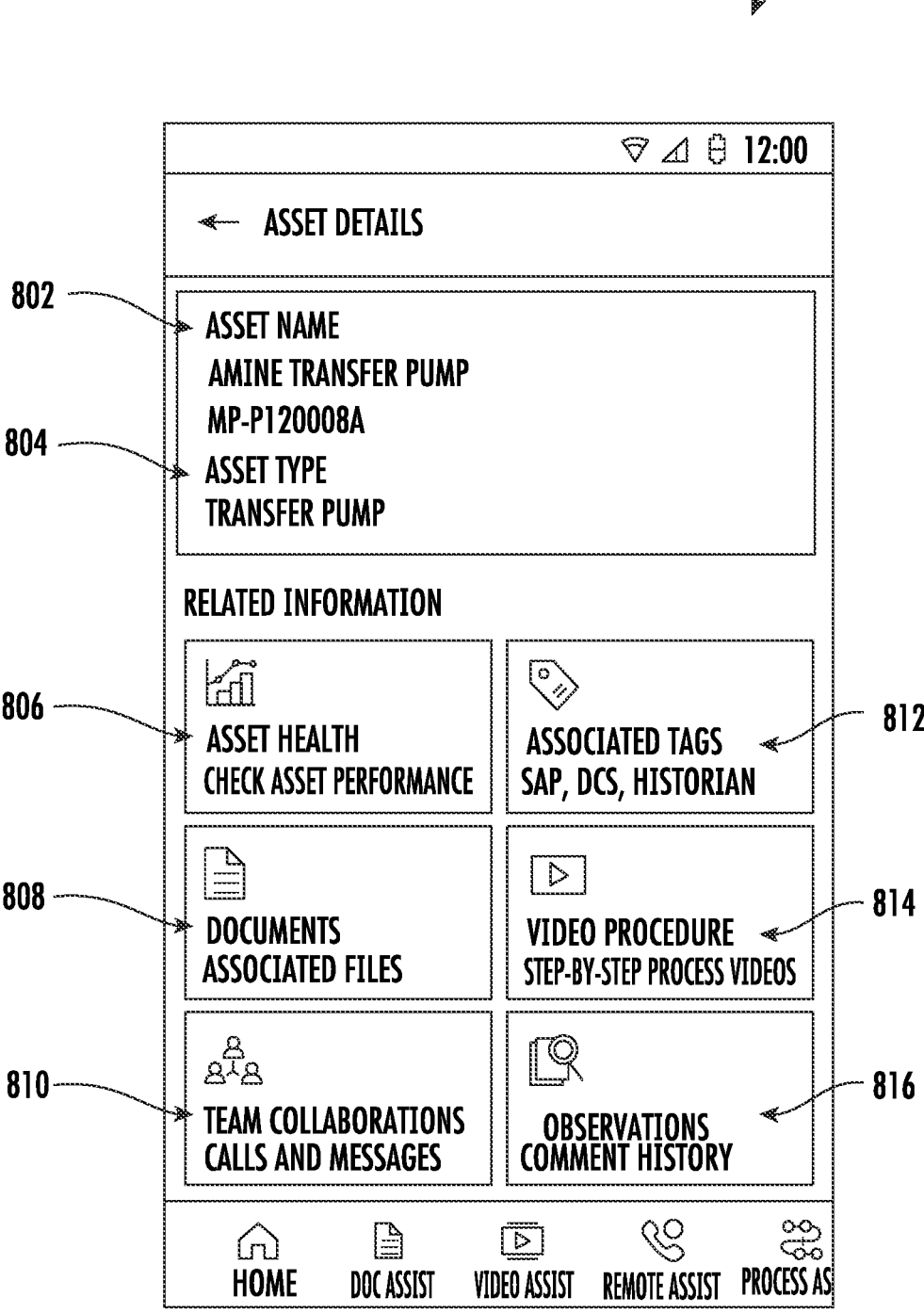
FIG. 8 illustrates another exemplary electronic interface, in accordance with one or more embodiments described herein.

FIG. 8 illustrates an exemplary electronic interface 800 according to one or more embodiments of the disclosure. In an embodiment, the electronic interface 800 is an electronic interface of the mobile computing device 302 that is presented via the visual display 304. In another embodiment, the electronic interface 800 is an electronic interface of the wearable device 602 that is presented via the head-mounted visual display. In one or more embodiments, the electronic interface 800 is associated with a remote collaboration environment (e.g., a remote collaboration session). In one or more embodiments, the display component 208 displays at least a portion of the media element data 116 (e.g., the one or more interactive media elements included in the media element data 116) via the electronic interface 800. For instance, in response to the request that is generated by the device system 202 via the remote collaboration request data 114, the display component 208 displays one or more interactive media elements associated with one or more industrial tasks for an industrial asset via the electronic interface 800. In an embodiment illustrated in FIG. 8, the electronic interface 800 includes asset details for an industrial asset. For instance, in one or more embodiments, the asset details presented via the electronic interface 800 includes an asset name 802 for the industrial asset, an asset type 804 for the industrial asset, asset health data 806 (e.g., asset performance data) for the industrial asset, one or more documents 808 related to the industrial asset, team collaboration data 810 (e.g., one or more calls and/or one or more messages) associated with the industrial asset, tag data 812 for the industrial asset, one or more video procedures 814 (e.g., one or more hypervideos that includes step-by-step process videos) associated with the industrial asset, and/or observation data 816 (e.g., historical comments and/or historical notes) associated with the industrial asset.

Figure 9:
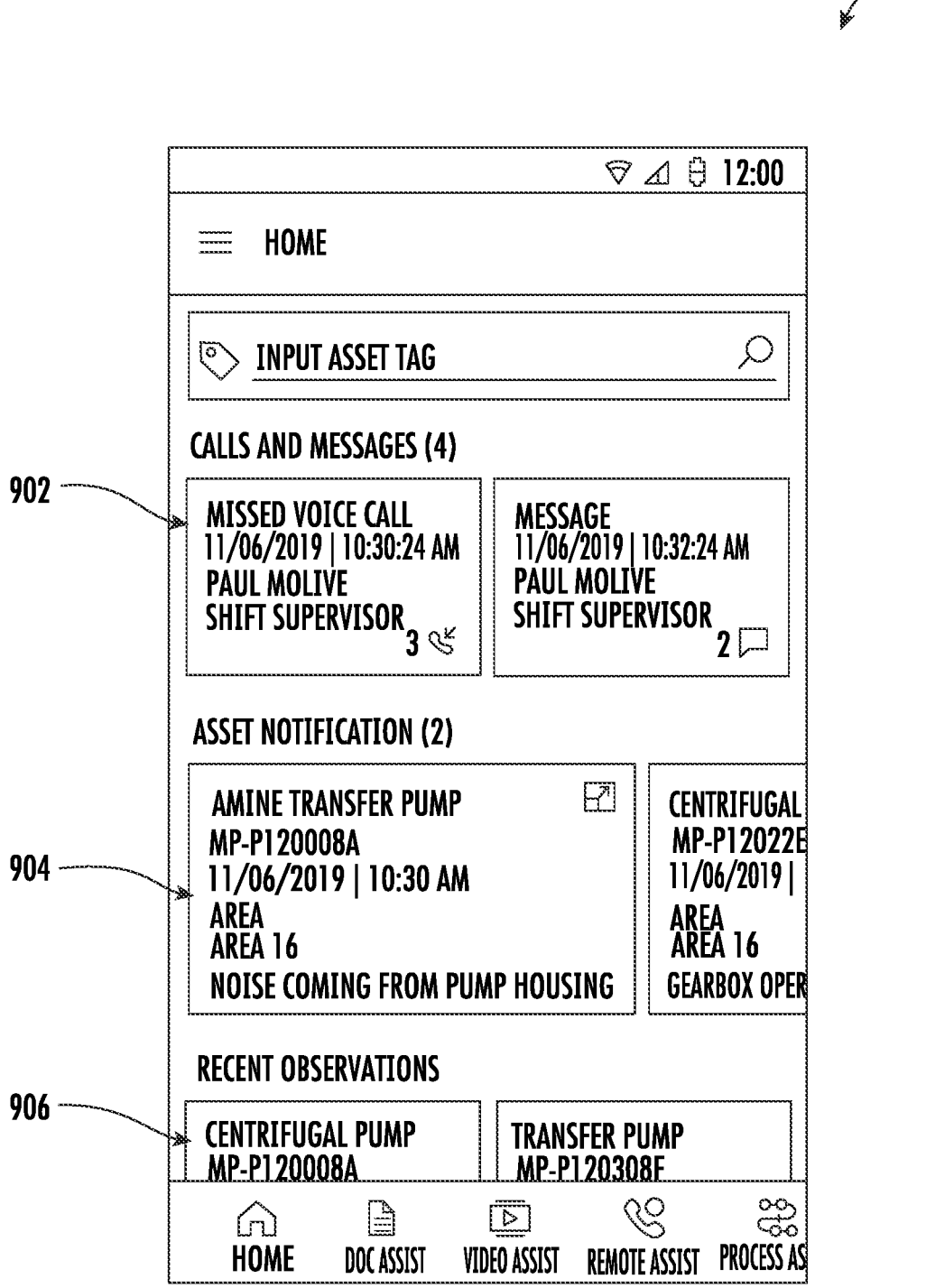
FIG. 9 illustrates yet another exemplary electronic interface, in accordance with one or more embodiments described herein.

FIG. 9 illustrates an exemplary electronic interface 900 according to one or more embodiments of the disclosure. In an embodiment, the electronic interface 900 is an electronic interface of the mobile computing device 302 that is presented via the visual display 304. In another embodiment, the electronic interface 900 is an electronic interface of the wearable device 602 that is presented via the head-mounted visual display. In one or more embodiments, the electronic interface 900 is associated with a remote collaboration environment (e.g., a remote collaboration session). In one or more embodiments, the display component 208 displays at least a portion of the media element data 116 (e.g., the one or more interactive media elements included in the media element data 116) via the electronic interface 900. For instance, in response to the request that is generated by the device system 202 via the remote collaboration request data 114, the display component 208 displays one or more interactive media elements associated with one or more industrial tasks for an industrial asset via the electronic interface 900. In an embodiment illustrated in FIG. 9, the electronic interface 900 includes media element data 902 associated with one or more calls and/or one or more messages related to an industrial asset. Additionally or alternatively, the electronic interface 900 includes asset notification data 904 associated with one or notifications related to a remote collaboration request for an industrial asset. Additionally or alternatively, the electronic interface 900 includes asset notification data 906 associated with one or observations related to respective industrial assets associated with one or more previous remote collaboration sessions.

Figure 10:
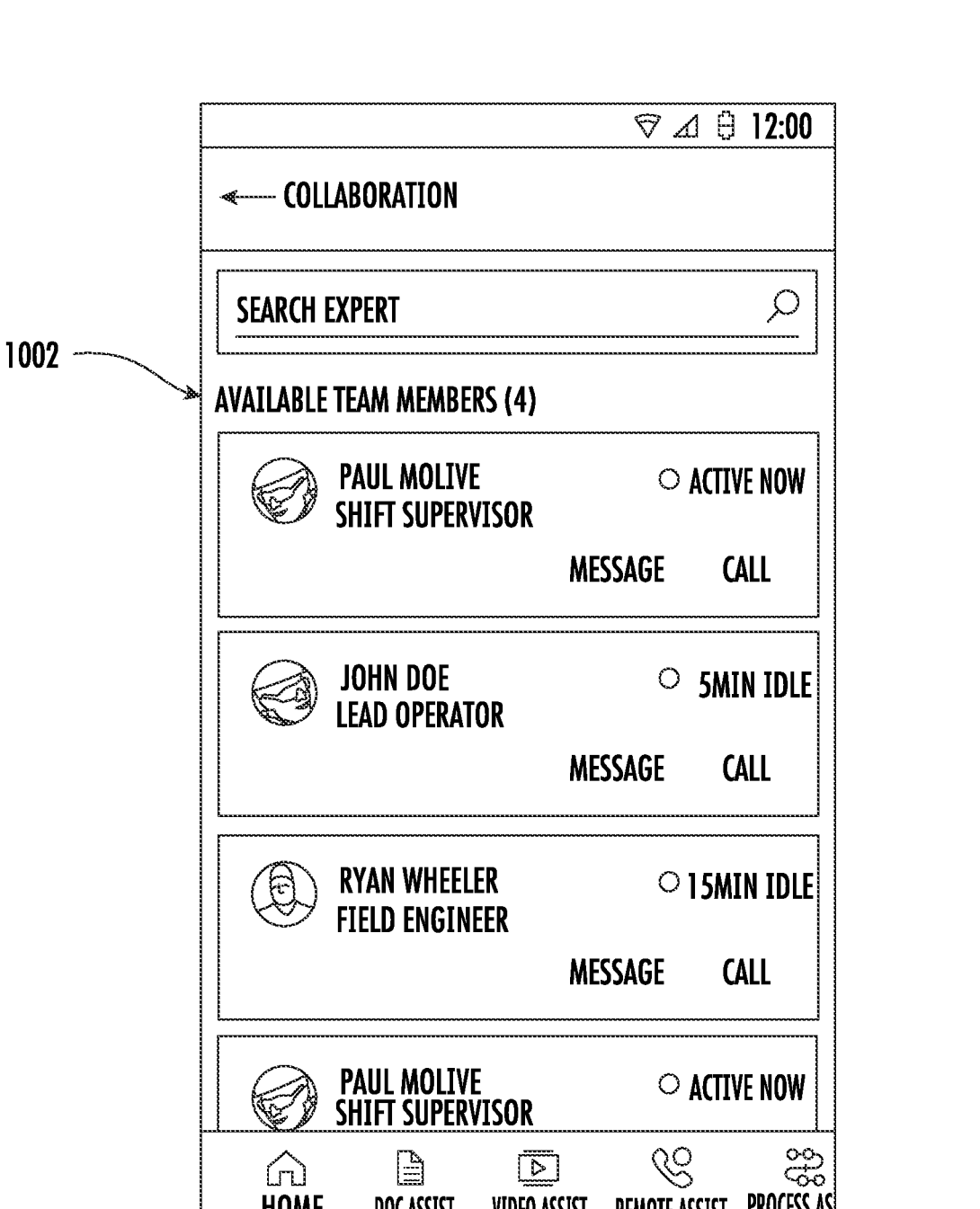
FIG. 10 illustrates yet another exemplary electronic interface, in accordance with one or more embodiments described herein.

FIG. 10 illustrates an exemplary electronic interface 1000 according to one or more embodiments of the disclosure. In an embodiment, the electronic interface 1000 is an electronic interface of the mobile computing device 302 that is presented via the visual display 304. In another embodiment, the electronic interface 1000 is an electronic interface of the wearable device 602 that is presented via the head-mounted visual display. In one or more embodiments, the electronic interface 1000 is associated with a remote collaboration environment (e.g., a remote collaboration session). In one or more embodiments, the display component 208 displays at least a portion of the media element data 116 (e.g., the one or more interactive media elements included in the media element data 116) via the electronic interface 1000. For instance, in response to the request that is generated by the device system 202 via the remote collaboration request data 114, the display component 208 displays one or more interactive media elements associated with one or more industrial tasks for an industrial asset via the electronic interface 1000. In an embodiment illustrated in FIG. 10, the electronic interface 1000 includes collaboration data associated with one or more remote experts for inclusion in a remote collaboration session. In an aspect, the one or more remote experts can be selected for presentation via the electronic interface 1000 based on data included in the remote collaboration request data 114. For example, in one or more embodiments, the one or more remote experts can be selected and/or ranked for presentation via the electronic interface 1000 based on at least one of an asset identifier and location data included in the remote collaboration request data 114.

Figure 11:
FIG. 11 illustrates yet another exemplary electronic interface, in accordance with one or more embodiments described herein.

FIG. 11 illustrates an exemplary electronic interface 1100 according to one or more embodiments of the disclosure. In an embodiment, the electronic interface 1100 is an electronic interface of the mobile computing device 302 that is presented via the visual display 304. In another embodiment, the electronic interface 1100 is an electronic interface of the wearable device 602 that is presented via the head-mounted visual display. In one or more embodiments, the electronic interface 1100 is associated with a remote collaboration environment (e.g., a remote collaboration session). In one or more embodiments, the display component 208 displays at least a portion of the media element data 116 (e.g., the one or more interactive media elements included in the media element data 116) via the electronic interface 1100. For instance, in response to the request that is generated by the device system 202 via the remote collaboration request data 114, the display component 208 displays one or more interactive media elements associated with one or more industrial tasks for an industrial asset via the electronic interface 1100. In an embodiment illustrated in FIG. 11, the electronic interface 1100 includes communication data 1102 associated with a remote collaboration environment. For example, in an embodiment, the electronic interface 1100 presents audio data, textual data, and/or video data provided by a remote expert (e.g., the remote computing device 502) participating in a remote collaboration session for the industrial asset.

Figure 12:
FIG. 12 illustrates yet another exemplary electronic interface, in accordance with one or more embodiments described herein.

FIG. 12 illustrates an exemplary electronic interface 1200 according to one or more embodiments of the disclosure. In an embodiment, the electronic interface 1200 is an electronic interface of the mobile computing device 302 that is presented via the visual display 304. In another embodiment, the electronic interface 1200 is an electronic interface of the wearable device 602 that is presented via the head-mounted visual display. In one or more embodiments, the electronic interface 1200 is associated with a remote collaboration environment (e.g., a remote collaboration session). In one or more embodiments, the display component 208 displays at least a portion of the media element data 116 (e.g., the one or more interactive media elements included in the media element data 116) via the electronic interface 1200. For instance, in response to the request that is generated by the device system 202 via the remote collaboration request data 114, the display component 208 displays one or more interactive media elements associated with one or more industrial tasks for an industrial asset via the electronic interface 1200. In an embodiment illustrated in FIG. 12, the electronic interface 1200 includes communication data 1202 associated with a remote collaboration environment. For example, in an embodiment, the electronic interface 1200 presents audio data, textual data, image data, video data and/or notification data provided by a remote expert (e.g., the remote computing device 502) participating in a remote collaboration session for the industrial asset. Additionally or alternatively, the electronic interface 1200 presents audio data, textual data, image data, video data and/or notification data provided by a field worker (e.g., the mobile computing device 302) also participating in the remote collaboration session for the industrial asset.

FIG. 13 illustrates a method 1300 for establishing a remote collaboration environment, in accordance with one or more embodiments described herein. The method 1300 is associated with the worker assist system 102, for example. For instance, in one or more embodiments, the method 1300 is executed at a device (e.g. the server system 402) with one or more processors and a memory. In one or more embodiments, the method 1300 begins at block 1302 that receives (e.g., by the collaboration request component 104) a request to establish a remote collaboration environment associated with an industrial asset in an industrial environment, where the request comprises: an asset identifier provided by a mobile computing device proximate to the industrial asset, and location data associated with the industrial asset (block 1302). The request to establish the remote collaboration environment provides one or more technical improvements such as, but not limited to, extended functionality for a mobile computing device, interaction with a mobile computing device, facilitating presentation of a particular type information via an electronic interface, and/or facilitating how to present the particular type of information via an electronic interface.

In one or more embodiments, the receiving the request to establish the remote collaboration environment includes receiving the request to establish the remote collaboration environment in response to a digital code being scanned by the mobile computing device. In one or more embodiments, the receiving the request to establish the remote collaboration environment includes receiving the request to establish the remote collaboration environment in response to establishment of a communication connection between the industrial asset and the mobile computing device. In one or more embodiments, the receiving the request to establish the remote collaboration environment includes receiving the request to establish the remote collaboration environment in response to a visual identification related to the industrial asset being identified via a camera of the mobile computing device.

At block 1304, it is determined whether the request is processed. If no, block 1304 is repeated to determine whether the request is processed. If yes, the method 1300 proceeds to block 1306. In response to the request, block 1306 determines (e.g., by the contextual component 106) contextual data for an industrial task associated with the industrial asset based on the asset identifier and the location data. The determining the contextual data provides one or more technical improvements such as, but not limited to, extended functionality for a mobile computing device.

The method 1300 also includes a block 1308 that generates (e.g., by the remote collaboration component 108) one or more interactive media elements associated with the industrial task based on the contextual data, the one or more interactive media elements communicated via the remote collaboration environment. The generating the one or more interactive media elements provides one or more technical improvements such as, but not limited to, extended functionality for a mobile computing device, interaction with a mobile computing device, facilitating presentation of a particular type information via an electronic interface, and/or facilitating how to present the particular type of information via an electronic interface.

In one or more embodiments, the generating the one or more interactive media elements includes generating the one or more interactive media elements based on at least one of video data and documentation data stored by a server system. In one or more embodiments, the generating the one or more interactive media elements includes generating the one or more interactive media elements based on at least one of audio data, video data, screensharing data and notification data provided by a remote computing device. In one or more embodiments, the generating the one or more interactive media elements includes generating the one or more interactive media elements based on camera data provided by the mobile computing device. In one or more embodiments, the generating the one or more interactive media elements includes generating the one or more interactive media elements comprising generating the one or more interactive media elements based on bandwidth data indicative of a bandwidth condition of the mobile computing device. The generating the one or more interactive media elements based on the bandwidth data provides one or more technical improvements such as, but not limited to, improving efficiency of a mobile computing device and/or providing varied experience via a mobile computing device.

In one or more embodiments, the method 1300 further includes rendering the one or more interactive media elements via a visual display of the mobile computing device. The rendering the one or more interactive media elements provides one or more technical improvements such as, but not limited to, extended functionality for a mobile computing device, interaction with a mobile computing device, facilitating presentation of a particular type information via an electronic interface, and/or facilitating how to present the particular type of information via an electronic interface.

In one or more embodiments, the method 1300 further includes rendering the one or more interactive media elements via a wearable device in communication with the mobile computing device. The rendering the one or more interactive media elements provides one or more technical improvements such as, but not limited to, extended functionality for a mobile computing device, interaction with a mobile computing device, facilitating presentation of a particular type information via an electronic interface, and/or facilitating how to present the particular type of information via an electronic interface.

In one or more embodiments, the method 1300 further includes in response to the request, selecting a remote computing device for the remote collaboration environment based on at least one of the asset identifier and the location data. The selecting the remote computing device provides one or more technical improvements such as, but not limited to, improving efficiency of a mobile computing device and/or providing varied experience via a mobile computing device.

In one or more embodiments, the method 1300 further includes establishing remote control of a camera of the mobile computing device by a remote computing device during a remote collaboration session associated with the remote collaboration environment. The establishing the remote control of the camera provides one or more technical improvements such as, but not limited to, extended functionality for a mobile computing device and/or interaction with a mobile computing device.

In one or more embodiments, the method 1300 further includes recording at least a portion of a remote collaboration session associated with the remote collaboration environment. Additionally, in one or more embodiments, the method 1300 further includes adding the portion of the remote collaboration session to a hypervideo. The recording the portion of the remote collaboration session and/or the adding the portion of the remote collaboration session to the hypervideo provides one or more technical improvements such as, but not limited to, extended functionality for a mobile computing device and/or interaction with a mobile computing device.

FIG. 14 illustrates a method 1400 for establishing a remote collaboration environment, in accordance with one or more embodiments described herein. The method 1400 is associated with the device system 202, for example. For instance, in one or more embodiments, the method 1400 is executed at a device (e.g. the mobile computing device 302) with one or more processors and a memory. In one or more embodiments, the method 1400 begins at block 1402 that generates (e.g., by the collaboration request component 204) a request to establish a remote collaboration environment that communicates one or more interactive media elements associated with an industrial asset in an industrial environment, the one or more interactive media elements generated based on contextual data for the industrial task, where the request comprises: an asset identifier provided by a mobile computing device proximate to the industrial asset, and location data associated with the industrial asset (block 1402). The generating the request to establish the remote collaboration environment provides one or more technical improvements such as, but not limited to, extended functionality for a mobile computing device, interaction with a mobile computing device, facilitating presentation of a particular type information via an electronic interface, and/or facilitating how to present the particular type of information via an electronic interface.

In one or more embodiments, the generating the request to establish the remote collaboration environment includes generating the request to establish the remote collaboration environment in response to a digital code being scanned by the mobile computing device. In one or more embodiments, the generating the request to establish the remote collaboration environment includes generating the request to establish the remote collaboration environment in response to establishment of a communication connection between the industrial asset and the mobile computing device. In one or more embodiments, the generating the request to establish the remote collaboration environment includes generating the request to establish the remote collaboration environment in response to a visual identification related to the industrial asset being identified via a camera of the mobile computing device.

At block 1404, it is determined whether the request is transmitted. If no, block 1404 is repeated to determine whether the request is transmitted. If yes, the method 1400 proceeds to block 1406. In response to the request, block 1406 receives (e.g., by the remote collaboration component 206) the one or more interactive media elements. The receiving the one or more interactive media elements provides one or more technical improvements such as, but not limited to, extended functionality for a mobile computing device.

The method 1400 also includes a block 1408 that displays (e.g., by the display component 208) the one or more interactive media elements associated with the industrial task for the industrial asset, where the contextual data is generated based on the asset identifier and the location data. The displaying the one or more interactive media elements provides one or more technical improvements such as, but not limited to, extended functionality for a mobile computing device, interaction with a mobile computing device, facilitating presentation of a particular type information via an electronic interface, and/or facilitating how to present the particular type of information via an electronic interface.

In one or more embodiments, the displaying the one or more interactive media elements includes displaying at least one of video data and documentation data provided by a server system. In one or more embodiments, the displaying the one or more interactive media elements includes displaying at least one of audio data, video data, screensharing data and notification data provided by a remote computing device. In one or more embodiments, the displaying the one or more interactive media elements includes generating camera data provided by a camera of the mobile computing device. Additionally, in one or more embodiments, the displaying the one or more interactive media elements includes overlaying the camera data with the one or more interactive media elements.

In one or more embodiments, the method 1400 further includes rendering the one or more interactive media elements via a visual display of the mobile computing device. The rendering the one or more interactive media elements provides one or more technical improvements such as, but not limited to, extended functionality for a mobile computing device, interaction with a mobile computing device, facilitating presentation of a particular type information via an electronic interface, and/or facilitating how to present the particular type of information via an electronic interface.

In one or more embodiments, the method 1400 further includes communicating with a wearable device to facilitate rendering the one or more interactive media elements via a wearable device. The communicating with the wearable device provides one or more technical improvements such as, but not limited to, extended functionality for a mobile computing device, interaction with a mobile computing device, facilitating presentation of a particular type information via an electronic interface, and/or facilitating how to present the particular type of information via an electronic interface.

In one or more embodiments, the method 1400 further includes enabling remote control of a camera of the mobile computing device by a remote computing device during the remote collaboration session. The enabling the remote control of the camera provides one or more technical improvements such as, but not limited to, extended functionality for a mobile computing device and/or interaction with a mobile computing device.

In one or more embodiments, the method 1400 further includes recording at least a portion of a remote collaboration session associated with the remote collaboration environment. Additionally, in one or more embodiments, the method 1400 further includes transmitting the recording to a server system to facilitate adding the portion of the communication to a hypervideo stored by the server system. The recording the portion of the remote collaboration session and/or the transmitting the recording provides one or more technical improvements such as, but not limited to, extended functionality for a mobile computing device and/or interaction with a mobile computing device.

In some example embodiments, certain ones of the operations herein can be modified or further amplified as described below. Moreover, in some embodiments additional optional operations can also be included. It should be appreciated that each of the modifications, optional additions or amplifications described herein can be included with the operations herein either alone or in combination with any others among the features described herein.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments can be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The hardware used to implement the various illustrative logics, logical blocks, modules, and circuits described in connection with the aspects disclosed herein can include a general purpose processor, a digital signal processor (DSP), a special-purpose processor such as an application specific integrated circuit (ASIC) or a field programmable gate array (FPGA), a programmable logic device, discrete gate or transistor logic, discrete hardware components, or any combination thereof designed to perform the functions described herein. A general-purpose processor can be a microprocessor, but, in the alternative, the processor can be any processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration. Alternatively, or in addition, some steps or methods can be performed by circuitry that is specific to a given function.

In one or more example embodiments, the functions described herein can be implemented by special-purpose hardware or a combination of hardware programmed by firmware or other software. In implementations relying on firmware or other software, the functions can be performed as a result of execution of one or more instructions stored on one or more non-transitory computer-readable media and/or one or more non-transitory processor-readable media. These instructions can be embodied by one or more processor-executable software modules that reside on the one or more non-transitory computer-readable or processor-readable storage media. Non-transitory computer-readable or processor-readable storage media can in this regard comprise any storage media that can be accessed by a computer or a processor. By way of example but not limitation, such non-transitory computer-readable or processor-readable media can include random access memory (RAM), read-only memory (ROM), electrically erasable programmable read-only memory (EEPROM), FLASH memory, disk storage, magnetic storage devices, or the like. Disk storage, as used herein, includes compact disc (CD), laser disc, optical disc, digital versatile disc (DVD), floppy disk, and Blu-ray disc™, or other storage devices that store data magnetically or optically with lasers. Combinations of the above types of media are also included within the scope of the terms non-transitory computer-readable and processor-readable media. Additionally, any combination of instructions stored on the one or more non-transitory processor-readable or computer-readable media can be referred to herein as a computer program product.

Many modifications and other embodiments of the inventions set forth herein will come to mind to one skilled in the art to which these inventions pertain having the benefit of teachings presented in the foregoing descriptions and the associated drawings. Although the figures only show certain components of the apparatus and systems described herein, it is understood that various other components can be used in conjunction with the supply management system. Therefore, it is to be understood that the inventions are not to be limited to the specific embodiments disclosed and that modifications and other embodiments are intended to be included within the scope of the appended claims. Moreover, the steps in the method described above can not necessarily occur in the order depicted in the accompanying diagrams, and in some cases one or more of the steps depicted can occur substantially simultaneously, or additional steps can be involved. Although specific terms are employed herein, they are used in a generic and descriptive sense only and not for purposes of limitation.

What is claimed is:

1. A mobile computing device,
comprising:
one or more processors;
memory; and
one or more programs stored in the memory, the one or more programs including instructions configured to:
    generate a request to establish a remote collaboration environment that communicates one or more interactive media elements associated with an industrial asset in an industrial environment, the one or more interactive media elements generated based on contextual data for an industrial task, wherein the request comprises:
    an asset identifier provided by the mobile computing device proximate to the industrial asset; and
    location data associated with the industrial asset; and
    in response to the request,
    receive the one or more interactive media elements based on a bandwidth condition of the mobile computing device, wherein the one or more interactive media elements are dynamically generated based on the contextual data that is determined using an ontological model, wherein the ontological model is configured to define relationships between the industrial assets and one or more operational dependencies between one or more other industrial assets;
    display the one or more interactive media elements associated with the industrial task for the industrial asset, wherein the contextual data is generated based on the asset identifier and the location data; and
    select a remote computing device for the remote collaboration environment based on at least one of the asset identifier and the location data, wherein the remote computing device facilitates remote control of a camera of the mobile computing device during a remote collaboration session associated with the remote collaboration environment.

2. The mobile computing device of claim 1, the one or more programs further including instructions configured to:
render the one or more interactive media elements via a visual display of the mobile computing device.

3. The mobile computing device of claim 1, the one or more programs further including instructions configured to:
communicate with a wearable device to facilitate rendering the one or more interactive media elements via the wearable device.

4. The mobile computing device of claim 1, the one or more programs further including instructions configured to:
display at least one of video data and documentation data provided by a server system.

5. The mobile computing device of claim 1, the one or more programs further including instructions configured to:
display at least one of audio data, video data, screensharing data and notification data provided by the remote computing device.

6. The mobile computing device of claim 1, the one or more programs further including instructions configured to:
generate camera data provided by the camera of the mobile computing device; and
overlay the camera data with the one or more interactive media elements.

7. The mobile computing device of claim 1, the one or more programs further including instructions configured to:
generate the request to establish the remote collaboration environment in response to a digital code being scanned by the mobile computing device.

8. The mobile computing device of claim 1, the one or more programs further including instructions configured to:
generate the request to establish the remote collaboration environment in response to establishment of a communication connection between the industrial asset and the mobile computing device.

9. The mobile computing device of claim 1, the one or more programs further including instructions configured to:
generate the request to establish the remote collaboration environment in response to a visual identification related to the industrial asset being identified via the camera of the mobile computing device.

10. The mobile computing device of claim 1, the one or more programs further including instructions configured to:
record at least a portion of the remote collaboration session associated with the remote collaboration environment; and
transmit the recording to a server system to facilitate adding the portion of a communication to a hypervideo stored by the server system.

11. A wearable device, comprising:
one or more processors;
memory; and
one or more programs stored in the memory, the one or more programs including instructions configured to:
    generate a request to establish a remote collaboration environment that communicates one or more interactive media elements associated with an industrial asset in an industrial environment, the one or more interactive media elements generated based on contextual data for an industrial task, wherein the request comprises:
    an asset identifier provided by a mobile computing device proximate to the industrial asset; and
    location data associated with the industrial asset; and
    in response to the request, receive the one or more interactive media elements based on a bandwidth condition of the mobile computing device, wherein the one or more interactive media elements are dynamically generated based on the contextual data that is determined using an ontological model, wherein the ontological model is configured to define relationships between the industrial asset and one or more operational dependencies between one or more other industrial assets;

display the one or more interactive media elements associated with the industrial task for the industrial asset, wherein the contextual data is generated based on the asset identifier and the location data; and select a remote computing device for the remote collaboration environment based on at least one of the asset identifier and the location data, wherein the remote computing device facilitates remote control of a camera of the mobile computing device during a remote collaboration session associated with the remote collaboration environment.

12. The wearable device of claim 11, the one or more programs further including instructions configured to:

render the one or more interactive media elements via a visual display of the wearable device.

13. The wearable device of claim 11, the one or more programs further including instructions configured to:

display at least one of video data and documentation data provided by a server system.

14. The wearable device of claim 11, the one or more programs further including instructions configured to:

display at least one of audio data, video data, screensharing data and notification data provided by the remote computing device.

15. The wearable device of claim 11, the one or more programs further including instructions configured to:

record at least a portion of the remote collaboration session associated with the remote collaboration environment; and transmit the recording to a server system to facilitate adding the portion of a communication to a hypervideo stored by the server system.

16. A non-transitory computer-readable storage medium comprising one or more programs for execution by one or more processors of a device, the one or more programs including instructions which, when executed by the one or more processors, cause the device to:

generate a request to establish a remote collaboration environment that communicates one or more interactive media elements associated with an industrial asset in an industrial environment, the one or more interactive media elements generated based on contextual data for an industrial task, wherein the request comprises:

an asset identifier provided by a mobile computing device proximate to the industrial asset; and location data associated with the industrial asset; and in response to the request, receive the one or more interactive media elements based on a bandwidth condition of the mobile computing device, wherein the one or more interactive media elements are dynamically generated based on the contextual data that is determined using an ontological model, wherein the ontological model is configured to define relationships between the industrial asset and one or more operational dependencies between one or more other industrial assets;

display the one or more interactive media elements associated with the industrial task for the industrial asset, wherein the contextual data is generated based on the asset identifier and the location data; and select a remote computing device for the remote collaboration environment based on at least one of the asset identifier and the location data, wherein the remote computing device facilitates remote control of a camera of the mobile computing device during a remote collaboration session associated with the remote collaboration environment.

17. The non-transitory computer-readable storage medium of claim 16, the one or more programs further including instructions which, when executed by the one or more processors, cause the device to:

render the one or more interactive media elements via a visual display.

18. The non-transitory computer-readable storage medium of claim 16, the one or more programs further including instructions which, when executed by the one or more processors, cause the device to:

display at least one of video data and documentation data provided by a server system.

19. The non-transitory computer-readable storage medium of claim 16, the one or more programs further including instructions which, when executed by the one or more processors, cause the device to:

display at least one of audio data, video data, screensharing data and notification data provided by the remote computing device.

* * * * *